(12) United States Patent
Oda

(10) Patent No.: US 11,765,279 B2
(45) Date of Patent: Sep. 19, 2023

(54) IMAGE FORMING SYSTEM AND CONTROL METHOD

(71) Applicant: CANON KABUSHIKI KAISHA, Tokyo (JP)

(72) Inventor: Yuichiro Oda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/934,498

(22) Filed: Sep. 22, 2022

(65) Prior Publication Data
US 2023/0096877 A1 Mar. 30, 2023

(30) Foreign Application Priority Data

Sep. 28, 2021 (JP) .................. 2021-158383

(51) Int. Cl.
*G06F 3/12* (2006.01)
*H04N 1/00* (2006.01)

(52) U.S. Cl.
CPC ..... *H04N 1/00037* (2013.01); *H04N 1/00076* (2013.01); *H04N 1/00413* (2013.01)

(58) Field of Classification Search
None
See application file for complete search history.

(56) References Cited

U.S. PATENT DOCUMENTS

| | | | |
|---|---|---|---|
| 2010/0002252 A1* | 1/2010 | Yamaguchi | G03G 15/55 358/1.15 |
| 2018/0059603 A1 | 3/2018 | Miyahara | |
| 2020/0210115 A1 | 7/2020 | Igawa | |
| 2020/0322492 A1 | 10/2020 | Kurohata | |
| 2021/0034310 A1 | 2/2021 | Ikuno | |
| 2021/0127018 A1 | 4/2021 | Obayashi et al. | |
| 2021/0321011 A1* | 10/2021 | Ito | H04N 1/00633 |
| 2021/0385339 A1* | 12/2021 | Iida | H04N 1/0044 |

FOREIGN PATENT DOCUMENTS

| | | | | |
|---|---|---|---|---|
| EP | 1830249 A2 | | 9/2007 | |
| JP | 2004020650 A | | 1/2004 | |
| JP | 2005210754 A | | 8/2005 | |
| JP | 2009157861 | * | 7/2009 | ............ H04N 1/00 |
| JP | 2019115991 | * | 7/2019 | ............ B41J 29/38 |
| JP | 2019215284 | * | 12/2019 | ............ H04N 1/00 |
| JP | 2020098268 A | | 6/2020 | |
| JP | 2020116765 | * | 8/2020 | ............ B41J 29/38 |

* cited by examiner

*Primary Examiner* — Beniyam Menberu
(74) *Attorney, Agent, or Firm* — Canon U.S.A., Inc. IP Division

(57) ABSTRACT

An image forming system includes an image forming unit, an inspection unit, a conveyance unit configured to convey a sheet to the inspection unit, a controller configured to execute a first inspection mode in which a sheet having an image formed thereon is conveyed by the conveyance unit to the inspection unit and is inspected, and a second inspection mode in which, without executing image forming by the image forming unit, a sheet is conveyed by the conveyance unit to the inspection unit and is inspected, and a setting unit configured to set a recovery process. The setting unit permits the setting of the recovery process in the first inspection mode and prohibits the setting of the recovery process in the second inspection mode.

13 Claims, 24 Drawing Sheets

FIG. 6

CORRECT ANSWER IMAGE IS BEING READ...
PRINT CORRECT ANSWER IMAGE

| NUMBER OF SHEETS PER COPY | SIDES TO BE INSPECTED |
|---|---|
| 1 ~501 | ☑ BOTH SIDES ~502 |
| | ☐ ONLY FRONT SIDE |
| | ☐ ONLY BACK SIDE |

CANCEL ~601

FIG. 24

ERROR OCCURRED.

PURGE AND RECOVERY MODE IS
SELECTED IN OFFLINE INSPECTION.
RESELECT OPERATION MODE.

OK

IMAGE FORMING SYSTEM AND CONTROL METHOD

BACKGROUND OF THE INVENTION

Field of the Invention

The present disclosure relates to an image forming system configured to inspect a sheet on which an image is formed, and a control method for controlling the image forming system.

Description of the Related Art

In recent years, there has been known an image forming system configured such that an image is formed on a sheet by a printing apparatus, and the sheet on which the image is formed is conveyed to an inspection apparatus connected to the printing apparatus for inspection. When an image is formed on a sheet by a printing apparatus and the sheet is inspected by an inspection apparatus connected to the printing apparatus, this inspection method is hereinafter referred to as an inline inspection. In the inline inspection, the inspection apparatus reads an image formed by the printing apparatus on a sheet, and determines whether the image on the sheet is normal. The inspection apparatus can detect, for example, a partially or entirely missing barcode or ruled line, a missing image, defective printing, a missing page, a color shift, and/or the like.

Japanese Patent Laid-Open No. 2004-20650 discloses that when a sheet on which an image has been formed is determined to be an abnormal sheet, this abnormal sheet is discharged to a discharge unit different from that to which normal sheets are discharged, and a correct image corresponding to the image formed on the abnormal sheet is printed on another sheet (this process is referred to as a recovery process). This makes it possible to prevent a final product from missing a page even when an abnormal sheet occurs.

It is also known to inspect a sheet in a process which, unlike the inline inspection, does not include printing using a printing apparatus. Such an inspection method is hereinafter referred to as offline inspection. In the offline inspection, it is possible to inspect sheets on which images have been previously formed by a printing apparatus which is not connected to the inspection apparatus.

Japanese Patent Laid-Open No. 2020-98268 discloses an image forming system capable of performing an offline inspection in addition to an inline inspection. This makes it possible to inspect sheets even in a situation in which only one of image forming systems used by a user has a connected inspection apparatus, such that after images are formed on sheets by an image forming system having no connected inspection apparatus, the sheets are inspected by the image forming system having the capability of the offline inspection.

However, in the image forming system disclosed in Japanese Patent Laid-Open No. 2020-98268, no consideration is given to performing a recovery process when an abnormal sheet occurs in the inline inspection or the offline inspection. Therefore, in the image forming system capable of performing both the inline inspection and the offline inspection, there is a desire for improvement in processing when an abnormal sheet occurs.

SUMMARY OF THE INVENTION

In view of the above, the present disclosure provides improved processing executable for a case where an abnormal sheet occurs in an image forming system capable of performing both the inline inspection and the offline inspection. An abnormal sheet having abnormality in the image formed on the sheet may be determined by inspecting the image of the sheet in terms of predetermined inspection items. The inspection of the image of the sheet may be performed by an inspection unit comparing, with respect to one or more inspection items associated with an image, the image of the sheet with a preregistered or predetermined correct answer image stored in the image forming system. The inspection items may be user selectable and/or may include misalignment of a printing position, a color tone of an image, a density of an image, a streak or blurring, a missing of printing, and/or the like.

According to an aspect, the present disclosure provides an image forming system including an image forming unit configured to form an image on a sheet, an inspection unit configured to inspect an image on a sheet, a conveyance unit configured to convey a sheet to the inspection unit, a controller configured to execute a first inspection mode in which an image is formed on a sheet by the image forming unit and the sheet having the image formed thereon is conveyed by the conveyance unit to the inspection unit and is inspected by the inspection unit, and a second inspection mode in which, without executing image forming by the image forming unit, a sheet is conveyed by the conveyance unit to the inspection unit and inspected by the inspection unit, and a setting unit configured to set a recovery process such that in a case where the inspection unit determines that the sheet conveyed by the conveyance unit is an abnormal sheet having abnormality in the image, an image corresponding to the image formed on the abnormal sheet is formed according to image data used to form the image on the abnormal sheet by the image forming unit on a sheet different from the abnormal sheet, wherein the setting unit permits the setting of the recovery process in the first inspection mode and prohibits the setting of the recovery process in the second inspection mode.

According to another aspect, the present disclosure provides an image forming system including an image forming unit configured to form an image on a sheet, an inspection unit configured to inspect an image on a sheet, a conveyance unit configured to convey a sheet to the inspection unit, a controller configured to execute a first inspection mode in which an image is formed on a sheet by the image forming unit and the sheet having the image formed thereon is conveyed by the conveyance unit to the inspection unit and is inspected by the inspection unit, and a second inspection mode in which, without executing image forming by the image forming unit, a sheet is conveyed by the conveyance unit to the inspection unit and inspected by the inspection unit, and a setting unit configured to set a recovery process such that in a case where the inspection unit determines that the sheet conveyed by the conveyance unit is an abnormal sheet having abnormality in the image, an image corresponding to the image formed on the abnormal sheet is formed according to image data used to form the image on the abnormal sheet by the image forming unit on a sheet different from the abnormal sheet, wherein in a case where a job is started in a state in which the recovery process is set by the setting unit so as to be performed in the second inspection mode, the controller cancels the job.

According to another aspect, the present disclosure provides an image forming system including an image forming unit configured to form an image on a sheet, an inspection unit configured to inspect an image on a sheet, a conveyance unit configured to convey a sheet to the inspection unit, a controller configured to execute a first inspection mode in which an image is formed on a sheet by the image forming unit and the sheet having the image formed thereon is conveyed by the conveyance unit to the inspection unit and is inspected by the inspection unit, and a second inspection mode in which, without executing image forming by the image forming unit, a sheet is conveyed by the conveyance unit to the inspection unit and inspected by the inspection unit, and a setting unit configured to set a process in which in a case where a sheet conveyed by the conveyance unit is determined, by the inspection unit, to be an abnormal sheet having abnormality in the image, the abnormal sheet is discharged to a discharge portion different from a discharge portion to which a normal sheet is discharged, and an image corresponding to the image formed on the abnormal sheet is printed on a sheet different from the abnormal sheet according to image data used to form the image on abnormal sheet, wherein the setting unit permits setting of the predetermined process in the first inspection mode and prohibits setting of the predetermined process in the second inspection mode.

According to another aspect, the present disclosure provides a method of controlling an image forming system including an image forming unit configured to form an image on a sheet, an inspection unit configured to inspect an image on a sheet, and a conveyance unit configured to convey a sheet to the inspection unit, the method including selecting one of a first inspection mode in which an image is formed on a sheet by the image forming unit and the sheet having the image formed thereon is conveyed by the conveyance unit to the inspection unit and is inspected by the inspection unit, and a second inspection mode in which, without executing image forming by the image forming unit, a sheet is conveyed by the conveyance unit to the inspection unit and inspected by the inspection unit, and setting a recovery process such that in a case where the inspection unit determines that the sheet conveyed by the conveyance unit is an abnormal sheet having abnormality in the image, an image corresponding to the image formed on the abnormal sheet is formed according to image data used to form the image on the abnormal sheet by the image forming unit on a sheet different from the abnormal sheet, wherein in the setting, the setting of the recovery process in the first inspection mode is permitted but the setting of the recovery process in the second inspection mode is prohibited.

Further features of the present invention will become apparent from the following description of embodiments with reference to the attached drawings.

BRIEF DESCRIPTION OF THE DRAWINGS

FIG. 6 is a diagram showing a display screen in a state in which a correct answer image is being read by an inspection apparatus.

FIG. 24 is a diagram showing an error screen displayed when a purge and recovery mode is set in an offline inspection.

DESCRIPTION OF THE EMBODIMENTS

Embodiments of the present disclosure are described in detail below with reference to the drawings. It should be noted that the embodiments described below are examples that embody the present disclosure, and the technical scope of the present disclosure is not limited to these examples.

First Embodiment

Image Forming System

Figure 1:
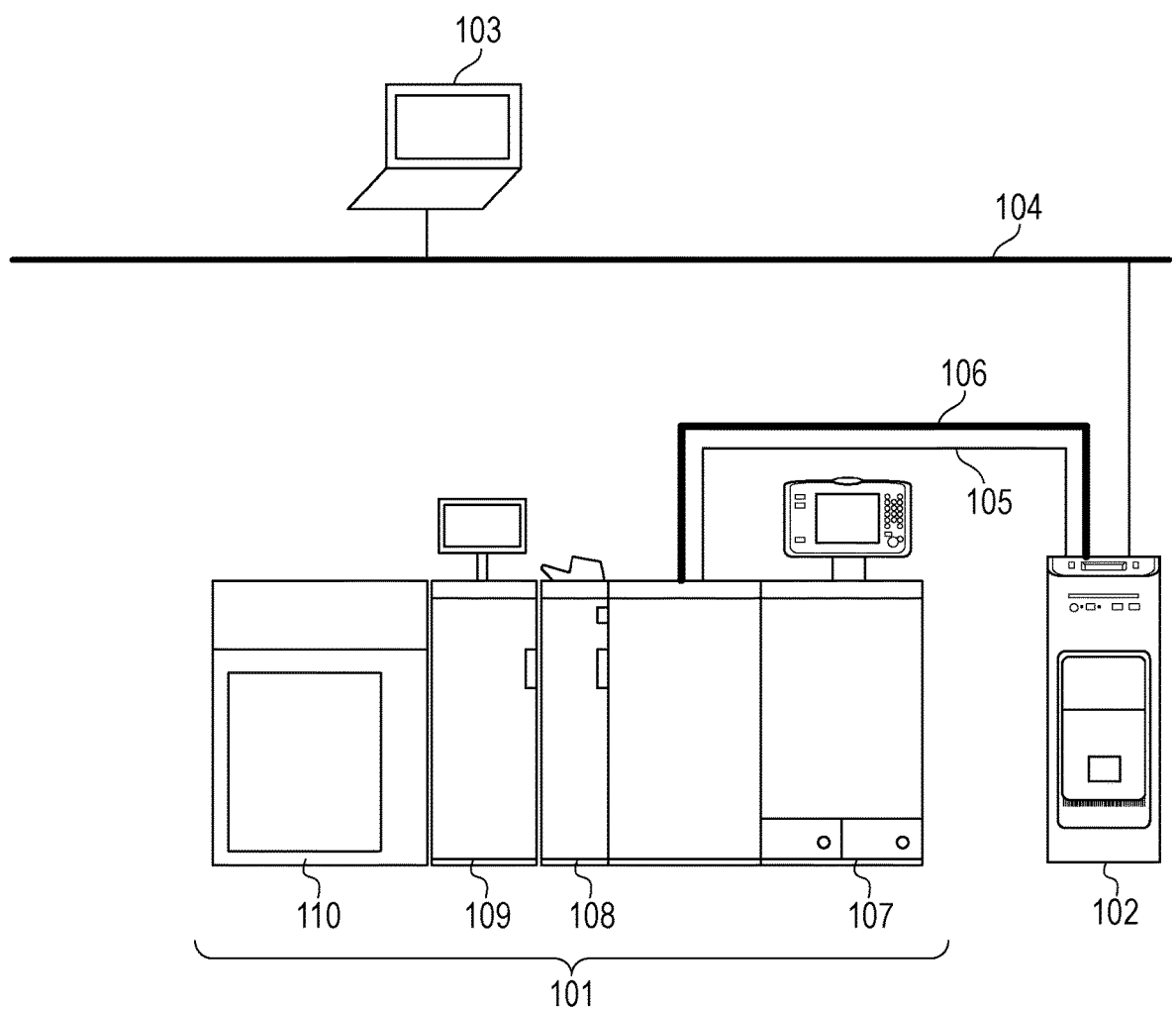
FIG. 1 is diagram illustrating an overall configuration of an image forming system.

FIG. 1 is a diagram illustrating an overall hardware configuration of an image forming system according to a first embodiment. The image forming system includes an image forming apparatus 101 and an external controller 102. The image forming apparatus 101 and the external controller 102 are communicably connected to each other via an internal LAN 105 and a video cable 106. The external controller 102 is communicably connected to a PC 103 via an external LAN 104. The PC 103 issues a print instruction to the external controller 102.

In the PC 103, a printer driver is installed which has a function of converting print data into a print description language that can be processed by the external controller 102. A user who performs printing is allowed to give a print instruction from various applications via the printer driver. The printer driver transmits print data to the external controller 102 based on a print instruction from the user. When the external controller 102 receives the print instruction from the PC 103, the external controller 102 performs data analysis and rasterization processing, inputs the print data to the image forming apparatus 101, and instructs it to perform printing.

The image forming apparatus 101 includes a printing apparatus 107, an inserter 108, an inspection apparatus 109, and a large-capacity stacker 110. The printing apparatus 107, which is an image forming unit, forms an image on a sheet based on an instruction given from the external controller 102. The inserter 108, which is a conveyance unit, inserts an insertion sheet between a plurality of sheets conveyed from the printing apparatus 107. The inspection apparatus 109, which is an inspection unit, reads an image of a conveyed sheet and compares it with a pre-registered correct answer image to determine whether or not the image of the sheet is normal. Here, the correct answer image is an image represented by image data to be compared with a sheet by the inspection apparatus 109. The image data of the correct answer image is prepared by the image forming apparatus 101 by reading a correctly printed sheet. The image data of the correct answer image may be sent from the PC 103. In the following description, a sheet determined to be normal (good) by the inspection apparatus 109 is referred to as a normal sheet, and a sheet determined to be abnormal (not good) by the inspection apparatus 109 is referred to as an abnormal sheet. For example, following a comparison by the inspection apparatus 109 of the image of a conveyed sheet with a corresponding pre-registered correct answer image (e.g. a predetermined image representing a correct image and which predetermined image is stored in the inspection apparatus 109 for comparing with an image of a subsequent conveyed sheet) using an image comparison method (examples of which are discussed below), when the inspection apparatus 109 determines that the image of a conveyed sheet matches substantially the corresponding pre-registered correct answer image (e.g. the differences between the images are minor/insignificant which may depend on the inspection level set which determines the sensitivity of the comparison), the sheet with the image is determined to be a normal sheet (e.g. correct or good) having a normal image and when the inspection apparatus 109 determines that the image of a conveyed sheet does not match the corresponding pre-registered correct answer image (e.g. the differences between the images are significant which may depend on the inspection level set which determines the sensitivity of the comparison), the sheet with the image is determined to be an abnormal sheet (not good) having abnormality in the image. The comparison may be made with respect to one or more inspection items associated with an image as described in more detail below. The large-capacity stacker 110 is a stacker with a large capacity for loading conveyed sheets in a stacked manner.

In the image forming system according to the present embodiment, the external controller 102 is connected to the image forming apparatus 101, but this is merely an example. The image forming system is not limited to this configuration in which the external controller 102 is connected to the image forming apparatus 101. For example, the image forming apparatus 101 may be connected to the external LAN 104, and the print data that can be processed by the image forming apparatus 101 may be transmitted from the PC 103.

In this case, the image forming apparatus 101 performs data analysis and rasterization processing, and executes printing processing.

Figure 2:
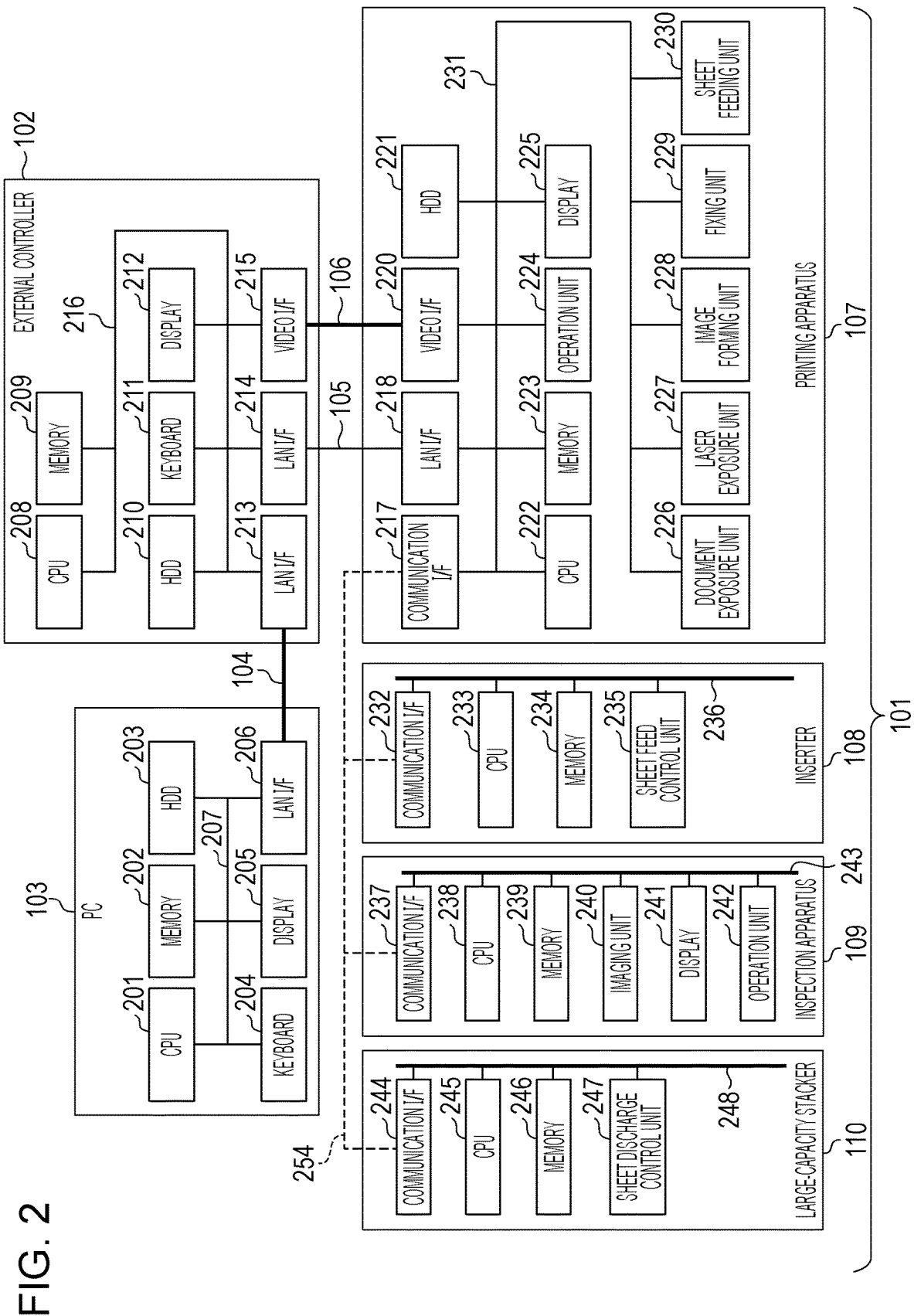
FIG. 2 is a block diagram showing a system configuration of an image forming system.

FIG. 2 is a block diagram showing a system configuration of the image forming apparatus 101, the external controller 102, and the PC 103. First, the configuration of the printing apparatus 107 of the image forming apparatus 101 is described. The printing apparatus 107 includes a communication I/F 217, a LAN I/F 218, a video I/F 220, an HDD 221, a CPU 222, a memory 223, an operation unit 224, and a display 225. Furthermore, the printing apparatus 107 also includes a document exposure unit 226, a laser exposure unit 227, an image forming unit 228, a fixing unit 229, and a sheet feeding unit 230. The components of the printing apparatus 107 are connected to each other via a system bus 231. The communication I/F 217 is connected to the inserter 108, the inspection apparatus 109, and the large-capacity stacker 110 via a communication cable 254, and communicates for control of each apparatus. The LAN I/F 218 is connected to the external controller 102 via the internal LAN 105 and communicates in terms of print data and the like. The video I/F 220 is connected to the external controller 102 via the video cable 106 and communicates image data and the like. HDD 221 is a storage apparatus in which a program and data are stored. The CPU 222 comprehensively controls image processing and printing based on a program or the like stored in the HDD 221. The memory 223 stores a program, image data, and/or the like and functions as a work area used by the CPU 222 in executing various kinds of processing. The operation unit 224 accepts inputs of various settings and operation instructions from a user. The display 225 displays setting information of the image processing apparatus, a processing state of a print job, and the like.

The document exposure unit 226 performs a process of reading a document when the copy function or the scan function is used. More specifically, the image is read by capturing an image by a CCD reading unit while illuminating a sheet placed by a user with an exposure lamp. The laser exposure unit 227 is an apparatus that performs primary charging and laser exposure, for irradiating a photosensitive drum with laser light to transfer a toner image. The laser exposure unit 227 first performs primary charging to charge the surface of the photosensitive drum to a uniform negative potential. Next, a laser driver illuminates the photosensitive drum with laser light while controlling the reflection angle of a laser beam from a polygon mirror. As a result, an electrostatic latent image is formed on the photosensitive drum. The image forming unit 228 is an apparatus for transferring toner to the sheet, and includes a developing unit, a transfer unit, a toner replenishing unit, and the like thereby transferring the toner on the photosensitive drum to the sheet. The developing unit supplies negatively charged toner from a developing cylinder to the photosensitive drum such that the negatively charged toner sticks to the electrostatic latent image on the surface of the photosensitive drum whereby the latent image is visualized. The transfer unit performs primary transferring by applying a positive potential to a primary transfer roller and transferring the toner on the surface of the photosensitive drum to a transfer belt. Furthermore, the transfer unit performs secondary transferring by applying a positive potential to a secondary transfer outer roller and transferring the toner on the transfer belt to the sheet. The fixing unit 229 is an apparatus for melting and fixing the toner on the sheet by heat and pressure, and includes a heater, a fixing belt, a pressure belt, and the like. The sheet feeding unit 230 is an apparatus for feeding a sheet. A sheet feeding operation and a sheet conveying operation are controlled by rollers and various sensors.

Next, the configuration of the inserter 108 of the image forming apparatus 101 is described. The inserter 108 includes a communication I/F 232, a CPU 233, a memory 234, and a sheet feed control unit 235. These components are connected via a system bus 236. The communication I/F 232 is connected to the printing apparatus 107 via a communication cable 254, and performs communication necessary for controlling the inserter 108. The CPU 233 performs various controls necessary for the sheet feeding process according to a control program stored in the memory 234. The memory 234 is a storage apparatus in which the control program is stored. The sheet feed control unit 235 controls conveying of a sheet fed from the sheet feeding unit 321 (also referred to as sheet feed tray) of the inserter 108 or from the printing apparatus 107 while controlling the rollers and the sensors under the control of the CPU 233.

Next, the configuration of the inspection apparatus 109 of the image forming apparatus 101 is described. The inspection apparatus 109 includes a communication I/F 237, a CPU 238, a memory 239, an imaging unit 240, a display 241, and an operation unit 242. These components are connected via a system bus 243. The communication I/F 237 is connected to the printing apparatus 107 via the communication cable 254 and performs communication necessary for controlling the inspection apparatus 109. The CPU 238 performs various controls necessary for the inspection according to a control program stored in the memory 239. The memory 239 is a storage apparatus in which the control program is stored. The imaging unit 240 captures an image of a sheet conveyed to the printing apparatus 107 based on an instruction given by the CPU 238. The CPU 238 compares the image captured by the imaging unit 240 with the correct answer image stored in the memory 239, and determines whether or not the printed image is correct. The display 241 displays an inspection result, a setting screen, and/or the like. The operation unit 242 is operated by the user and accepts instructions such as an instruction to change a setting of the inspection apparatus 109, an instruction to register a correct answer image, and/or the like.

Next, the configuration of the large-capacity stacker 110 of the image forming apparatus 101 is described. The large-capacity stacker 110 includes a communication I/F 244, a CPU 245, a memory 246, and a sheet discharge control unit 247, in which these components are connected via a system bus 248. The communication I/F 244 is connected to the printing apparatus 107 via a communication cable 254, and performs communication necessary for controlling the large-capacity stacker 110. The CPU 245 performs various controls necessary for discharging a sheet according to a control program stored in the memory 246. The memory 246 is a storage apparatus in which the control program is stored. Under the control of the CPU 245, the sheet discharge control unit 247 controls conveying of a sheet from the large-capacity stacker 110 to a stack tray 341 or an escape tray 346.

Next, the configuration of the external controller 102 is described. The external controller 102 includes a CPU 208, a memory 209, an HDD 210, a keyboard 211, a display 212, a LAN I/F 213, a LAN I/F 214, and video I/F 215. The components of the external controller 102 are connected via a system bus 216. The CPU 208 comprehensively executes processing such as receiving of print data from the PC 103, RIP processing, and transmitting of print data to the image forming apparatus 101 based on a program and data stored in the HDD 210. The memory 209 stores a program, image data, and/or the like and functions as a work area used by the CPU 208 in executing various kinds of processing. The HDD 210 stores programs and data necessary for operations such as printing processing. The keyboard 211 is an apparatus for inputting an operation instruction to the external controller 102. The display 212 displays information related to an execution application of the external controller 102 in the form of a still image or a moving image according to a video signal. The LAN I/F 213 is connected to the PC 103 via the external LAN 104, and the LAN I/F 213 performs communication related to a print instruction and/or the like. The LAN I/F 214 is connected to the image forming apparatus 101 via the internal LAN 105. The LAN I/F 214 performs communication related to a print instruction and/or the like. The video I/F 215 is connected to the image forming apparatus 101 via the video cable 106. The video I/F 215 performs communication relating to a print data and/or the like.

Next, a configuration of the PC 103 is described below. The PC 103 includes a CPU 201, a memory 202, an HDD 203, a keyboard 204, a display 205, and a LAN I/F 206. These components are connected to each other via a system bus 207. The CPU 201 generates print data and executes a print instruction based on a document processing program or the like stored in the HDD 203. Furthermore, the CPU 201 comprehensively controls devices connected to the system bus. The memory 202 stores a program, image data, and/or the like and functions as a work area used by the CPU 201 in executing various kinds of processing. The HDD 203 stores programs and data necessary for operations such as printing processing. The keyboard 204 is an apparatus for inputting an operation instruction to the PC 103. The display 205 displays information related to an execution application of the PC 103 in the form of a still image or a moving image according to a video signal. The LAN I/F 206 is connected to the external controller 102 via the external LAN 104. The LAN I/F 206 performs communication related to a print instruction and/or the like.

In the example described above, the external controller 102 and the image forming apparatus 101 are connected to each other via the internal LAN 105 and the video cable 106. However, other configurations are possible as long as data necessary for printing can be transmitted and received. For example, the external controller 102 and the image forming apparatus 101 may be connected to each other only via the video cable. The memory 202, the memory 209, the memory 223, the memory 234, the memory 239, and the memory 246 each may be any type of storage apparatus capable of storing data, programs, and/or the like. The types usable for them include, for example, a volatile RAM, a non-volatile ROM, an internal HDD, an external HDD, and a USB memory.

Image Forming Apparatus

Figure 3:
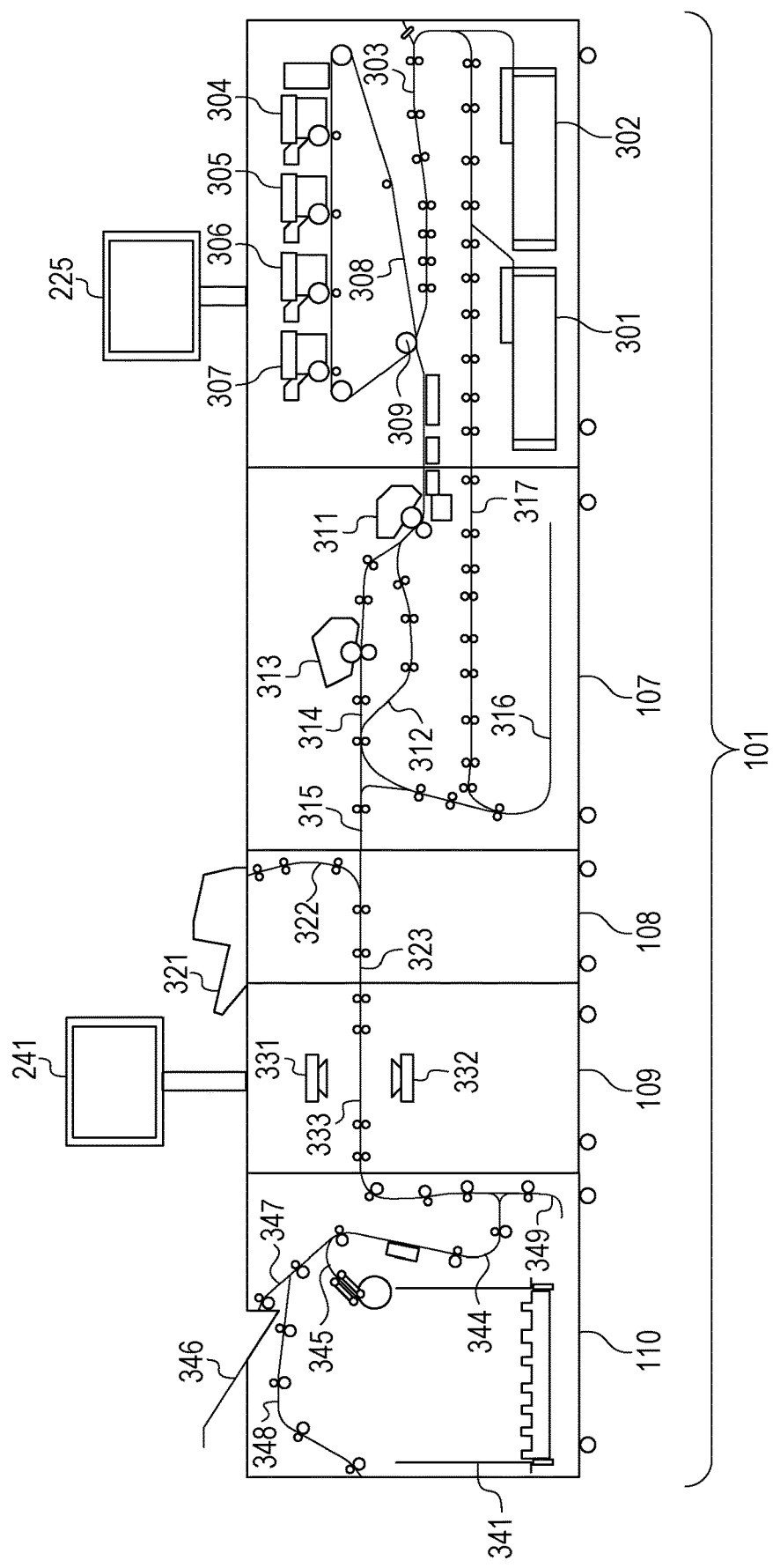
FIG. 3 is a schematic cross-sectional view of an image forming apparatus.

Next, the image forming apparatus 101 is described below with reference to FIG. 3. FIG. 3 is a schematic cross-sectional view of the image forming apparatus 101. The printing apparatus 107 includes sheet feed decks 301 and 302. Various sheets are loaded on the sheet feed decks 301 and 302. The sheet feed decks 301 and 302 are each capable of separating only one uppermost sheet from stacked sheets and conveying it to the sheet conveyance path 303. Development stations 304 to 307 form toner images using colored toners of Y, M, C, and K, respectively, so as to form a color image. The toner images formed by the development stations 304 to 307 are primarily transferred to an intermediate transfer belt 308. The intermediate transfer belt 308 rotates clockwise in FIG. 3, and the toner image is transferred, at a secondary transfer position 309, to a sheet transferred from the sheet conveyance path 303. The display 225 displays information related to the print status and settings of the image forming apparatus 101. A first fixing unit 311 includes a pressure roller and a heating roller and operates such that when the sheet passes between the rollers, the toner is melt while being pressed thereby fixing the toner image on the sheet. After the sheet is passed through the first fixing unit 311, the sheet is conveyed to the inserter 108 along sheet conveyance paths 312 and 315. Depending on the type of the sheet, further melting and pressing may be necessary. In such a case, after the sheet is passed through the first fixing unit 311, the sheet is conveyed to a second fixing unit 313 via an upper sheet conveyance path and additional melting and pressing is performed by the second fixing unit 313. Thereafter, the sheet is conveyed to the inserter 108 via sheet conveyance path paths 314 and 315. In a case where it is specified that an image is formed on both sides of the sheet, the sheet is inverted by a sheet inversion path 316 and conveyed to a double-sided conveyance path 317, and an image is transferred to the second surface at a secondary transfer position 309.

The inserter 108 inserts an insertion sheet between sheets conveyed from the printing apparatus 107. The inserter 108 includes an inserter tray 321 that functions as a sheet feed tray, and operates to join sheets such that the insertion sheet fed from the inserter tray 321 via the sheet conveyance path 322 is joined with sheets conveyed by a sheet conveyance path 323. Thus, the inserter 108 is capable of inserting an insertion sheet, at any specified position, between sheets conveyed from the printing apparatus 107. Note that the inserter 108 is also capable of conveying a sheet to the inspection apparatus 109 by feeding the sheet from the inserter tray 321 regardless of the printing operation. That is, the inserter 108 is capable of conveying, to the inspection apparatus 109, both a sheet that is image-formed and discharged by the printing apparatus 107 and a sheet that is different from the sheet that is image-formed and discharged by the printing apparatus 107 (e.g. the inserter 108 is capable of conveying, to the inspection apparatus 109, a sheet on which an image has been previously formed (such as by the image forming unit 107 or by another image forming unit 107) and which has not been conveyed from the image forming unit 107 as part of performing a print job and so is conveyed to the inspection apparatus as part of a job without executing image forming by the image forming unit 107 having been previously performed).

The inspection apparatus 109 reads the image of the sheet conveyed through the sheet conveyance path 323 of the inserter 108, and determines whether or not the images of the sheet are normal (for example, by performing a comparison with a predetermined correct answer image as discussed above). Reading units 331 and 332 are disposed inside the inspection apparatus 109 so as to face each other. The reading unit 331 reads the image on the first side of the sheet, and the reading unit 332 reads the image on the second side, opposite to the first side, of the sheet. The inspection apparatus 109 performs the inspection such that when the sheet conveyed via a sheet conveyance path 333 reaches a predetermined position, the images of the sheet are read using the reading units 331 and 332, and a determination is made as to whether or not the images of the sheet are normal. The display 241 displays information regarding a result of the inspection performed by the inspection apparatus 109.

The large-capacity stacker 110 includes, as a first discharge unit (also referred to as a first discharge portion) for discharging sheets, the stack tray 341 including a lift table and an eject table. The large-capacity stacker 110 has a shift function of discharging a sheet, on the stack tray 341, to a position shifted by a predetermined amount from other sheets. The sheet that has passed through the inspection apparatus 109 is conveyed to the large-capacity stacker 110 via the sheet conveyance path 344. The sheet is conveyed via a sheet conveyance path 344 and further via a sheet conveyance path 345, and stacked on the lift table of the stack tray 341. When no sheet is loaded on the lift table, the lift table stands by at a top position. The lift table is controlled such that the lift table is lowered as the sheets are loaded, and the upper end of the bundle of stacked sheets is at a predetermined height. When the loading of the sheets is completed or when the lift table is fully loaded, the lift table is lowered to the position of an eject table. The lift table and the eject table are configured such that bars supporting the sheet bundle are located at staggered positions. Therefore, when the lift table descends until reaching a position lower than the eject table, the sheet bundle comes into a state in which the sheet bundle is transshipped to the eject table.

The large-capacity stacker 110 also include, as a second discharge unit (also referred to as a first discharge portion), an escape tray 346 for discharging a sheet. The escape tray 346 operates such that when the inspection apparatus 109 determines that a sheet is abnormal (as discussed above), this abnormal sheet is discharged onto the escape tray 346. In a case where the abnormal sheet is discharged to the escape tray 346, the abnormal sheet is conveyed via the sheet conveyance path 344 and further via a sheet conveyance path 347, and conveyed to the stack tray 346. In a case where a post-processing apparatus is connected to the downstream side of the large-capacity stacker 110, the sheet is conveyed to the post-processing apparatus via a sheet conveyance path 348. The large-capacity stacker 110 includes an inversion unit 349 for inverting a sheet between the front and back sides of the sheet. The inversion unit 349 is used when the sheet is stacked on the stack tray 341. In a case where the large-capacity stacker 110 conveys the sheet to the escape tray 346 or the subsequent post-processing apparatus, the inversion unit 349 does not perform the inversion operation.

Operation of Inspection Apparatus

FIGS. 4 to 12 each illustrate an example of a screen displayed on the display 241 of the inspection apparatus 109. The inspection apparatus 109 inspects the image of the sheet conveyed to the inspection apparatus 109 in terms of predetermined inspection items. The inspection of the image of the sheet is performed by comparing the image of the sheet read by the reading unit 331 or 332 with a correct answer image registered in the memory 239 in advance. Image comparison methods include a method of comparing pixel values for each image position, a method of comparing positions of objects by edge detection, and a method of extracting character data by OCR (Optical Character Recognition). The inspection items include misalignment of a printing position, a color tone of an image, a density of an image, a streak or blurring, a missing of printing, and/or the like. In the present embodiment, each button displayed on the display 241 and the display 225 is a soft key that a user is allowed to touch with a finger for selection.

Figure 4:
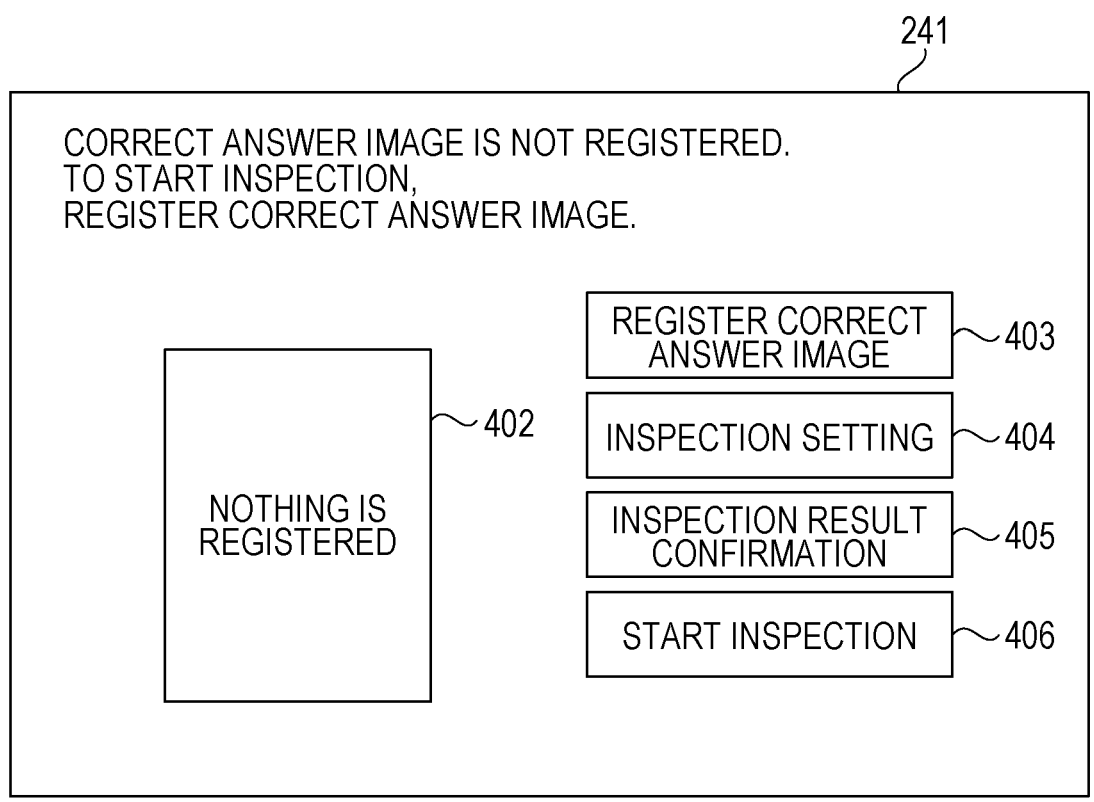
FIG. 4 is a diagram showing a display screen in a state before a correct answer image is registered in an inspection apparatus.

FIG. 4 illustrates an example of a display screen displayed on the display 241 of the inspection apparatus 109 when the inspection apparatus 109 is started. In the example of the display screen shown in FIG. 4, the display 241 indicates that no correct answer image is registered, and thus a message is displayed to inform that a correct answer image needs to be registered to start the inspection. In a case where the correct answer image has already been registered, a message is displayed to inform that the inspection can be started. On the display 241, a registered correct answer image is displayed in an image display area 402. In the example shown in FIG. 4, a message indicating that no correct answer image is registered is displayed in the image display area 402. A button 403 is for opening a registration screen for registering the correct answer image. A button 404 is for opening an inspection setting screen. A button 405 is for opening a screen for confirming an inspection result. A button 406 is for instructing to start an instruction.

Figure 5:
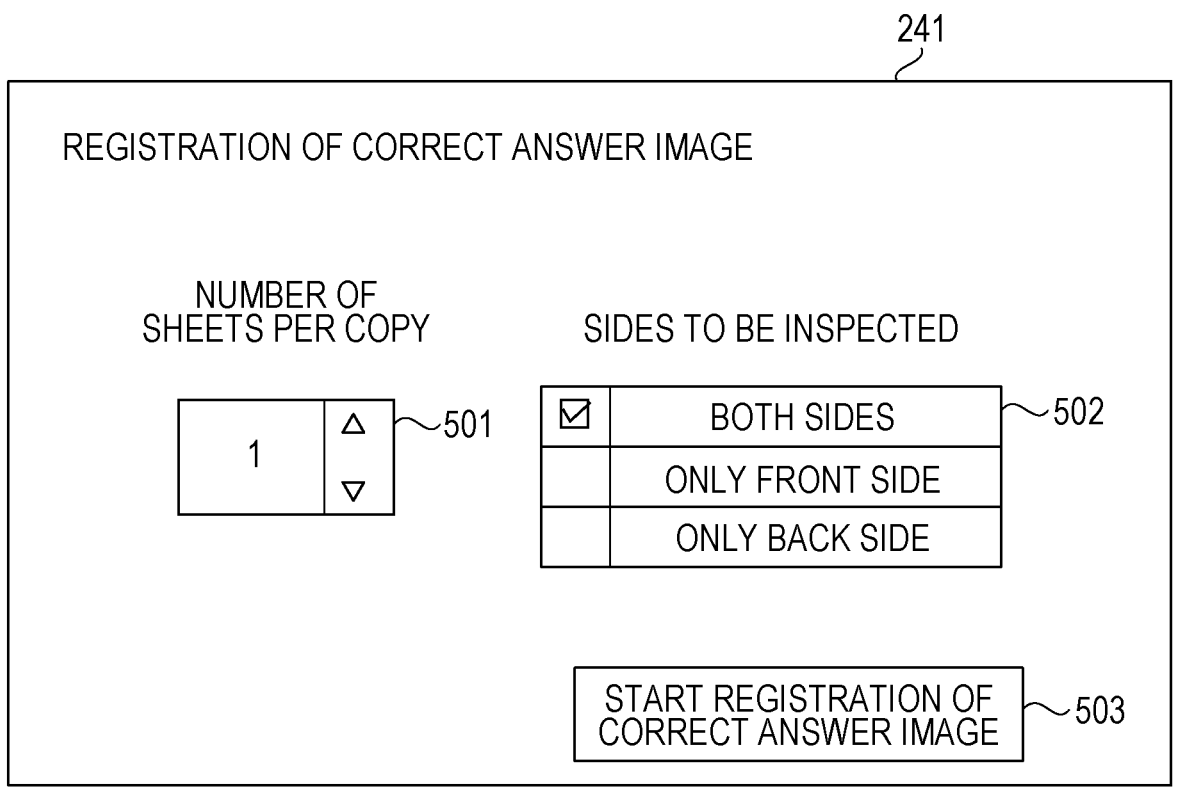
FIG. 5 is a diagram showing a display screen in a state in which a correct answer image is being registered in an inspection apparatus.

FIG. 5 illustrates an example of a display screen displayed on the display 241 of the inspection apparatus 109 when a user registers a correct answer image. The display screen shown in FIG. 5 is displayed on the display 241 when the button 403 shown in FIG. 4 is selected. A number-of-sheet setting area 501 is used to set the number of sheets per copy in a print job for which the inspection is to be performed. In a case of a print job in which the number of sheets per copy is two or more, it is allowed to register a plurality of images as correct answer images in the inspection apparatus 109. A side setting area 502 is for setting a side of a sheet to be inspected by the inspection apparatus 109. The user is allowed to set via the side setting area 502 whether to inspect the images on both sides of the sheet, only the image on the front side, or only the image on the back side. Even in a case where printing is performed on only one side of the sheet, it is possible to set that both sides are to be inspected to determine whether or not dust or the like is attached to the non-printed side. A button 503 is for instructing to register a correct answer image. When the button 503 is selected, the inspection apparatus 109 reads the image of the conveyed sheet and registers the image data thereof as data of a correct answer image.

FIG. 6 illustrates an example of a display screen displayed on the display 241 when the inspection apparatus 109 is reading an image of a sheet to register a correct answer image. The display screen shown in FIG. 6 is displayed when the button 503 shown in FIG. 5 is selected. A button 601 is for instructing to stop a reading process. In a case where the button 601 is selected, the inspection apparatus 109 stops the image reading process, and the screen displayed on the display 241 returns to the display screen shown in FIG. 4.

Figure 7:
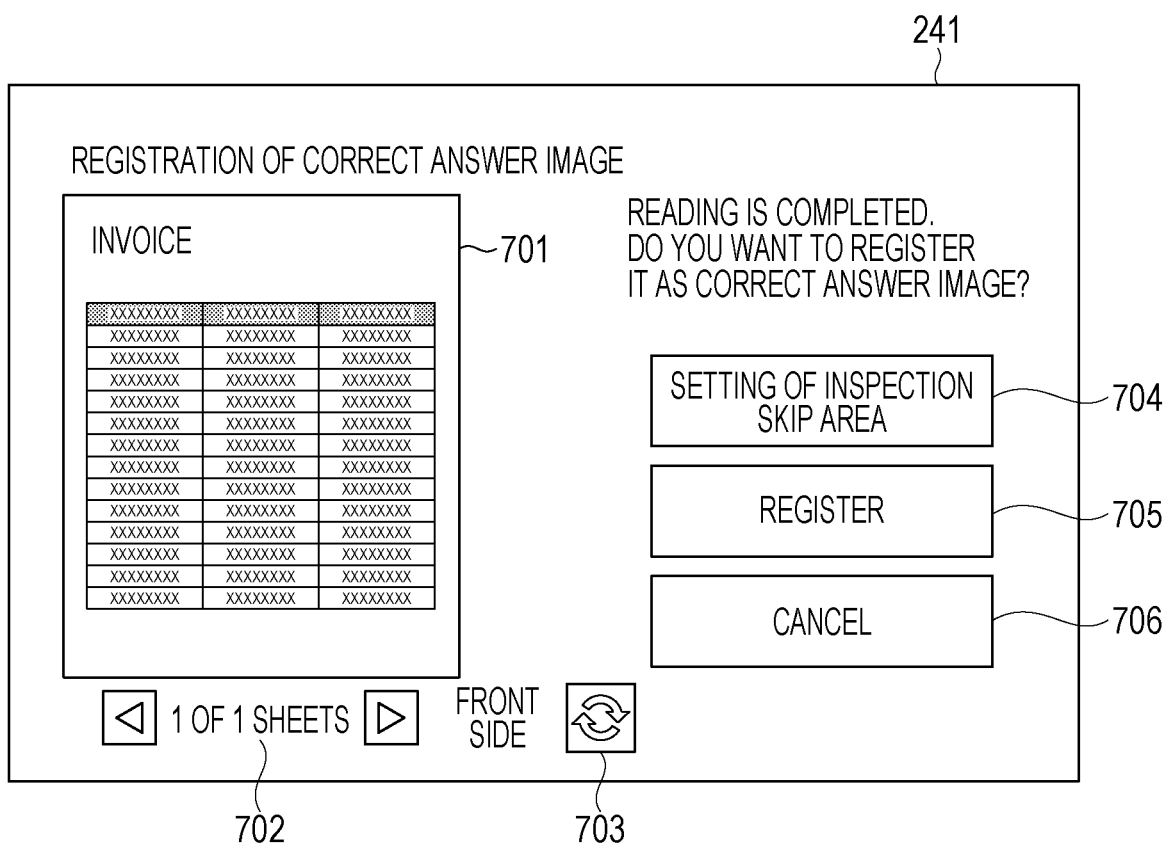
FIG. 7 is a diagram showing a display screen in a state in which a correct answer image has been read by an inspection apparatus.

FIG. 7 illustrates an example of a display screen displayed on the display 241 when reading of a correct answer image is completed. The image of the sheet read by the inspection apparatus 109 is displayed in an image display area 701. In a case where there are a plurality of images, it is possible to switch the displayed image by operating a switching button 702. In a case where both sides are to be inspected, the displayed side can be switched between front and back sides by operating a switching button 703. A button 704 is for instructing to set an inspection skip area. Using the button 704, it is possible to set an area that is not inspected, for example, in variable data printing (VDP) or the like in which a content of printing in a specific area is varied copy by copy. A button 705 is for registering the image displayed in the image display area 701 as a correct answer image. When the button 705 is selected, the inspection apparatus 109 registers the correct answer image, and the screen returns to the display screen shown in FIG. 4. A button 706 is for canceling the reading. When the button 706 is pressed, the inspection apparatus 109 returns the screen of the display 241 to that shown in FIG. 4 without registering the correct answer image.

Figure 8:
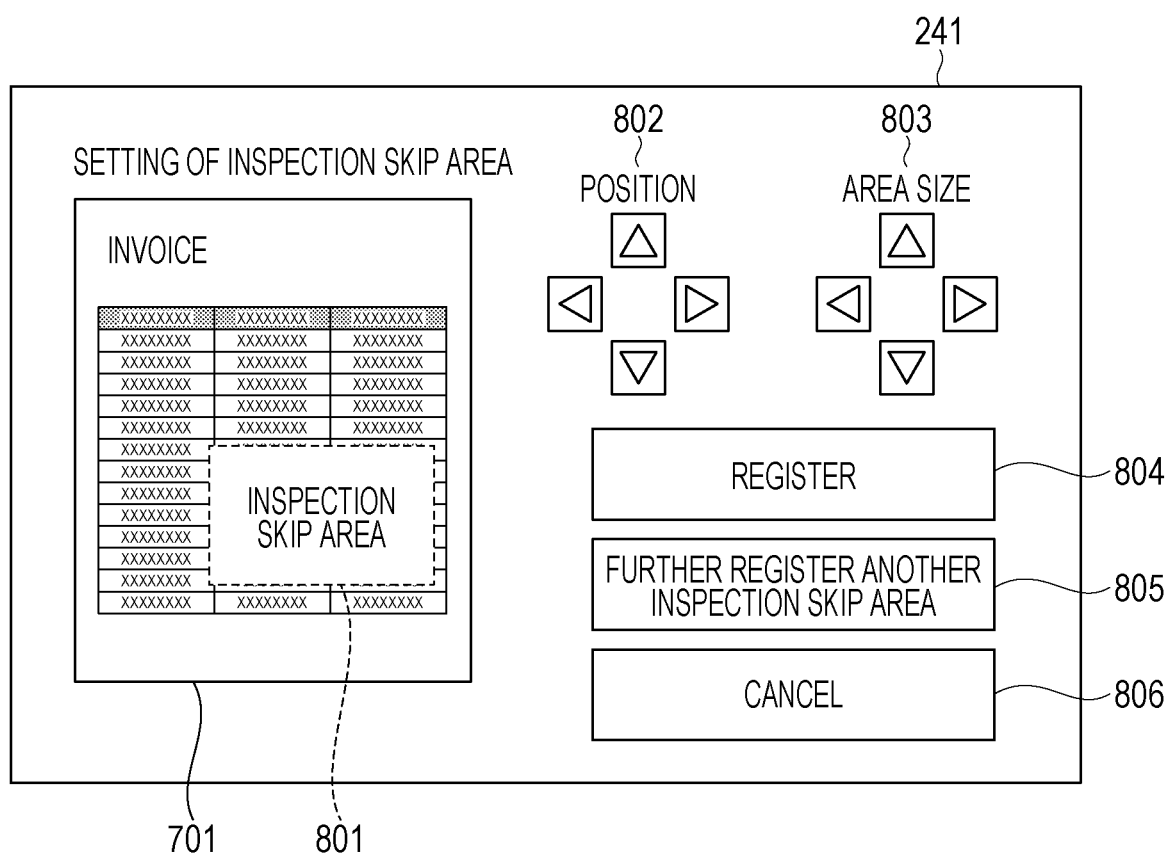
FIG. 8 is a diagram showing a display screen in a state in which an inspection skip area is set.

FIG. 8 illustrates an example of a screen, displayed on the display 241, for setting an inspection skip area. The display screen shown in FIG. 8 is displayed on the display 241 when the button 704 is selected. An area 801 indicates an inspection skip area. The user is allowed to change the position of the area 801 by using a position setting buttons 802, and is allowed to change the size of the area 801 by using size setting buttons 803. A button 804 is for registering settings of the inspection skip area. When the button 804 is selected, the inspection apparatus 109 registers the area 801 as an inspection skip area, and the screen displayed on the display 241 returns to the display screen shown in FIG. 7. A button 805 is for further registering another inspection skip area. By this button 805, the inspection apparatus 109 can register a plurality of inspection skip areas for one piece of image data. A button 806 is for cancelling the settings of the inspection skip area.

When the button 806 is selected, the screen displayed on the display 241 returns to the display screen shown in FIG. 7.

Figure 9:
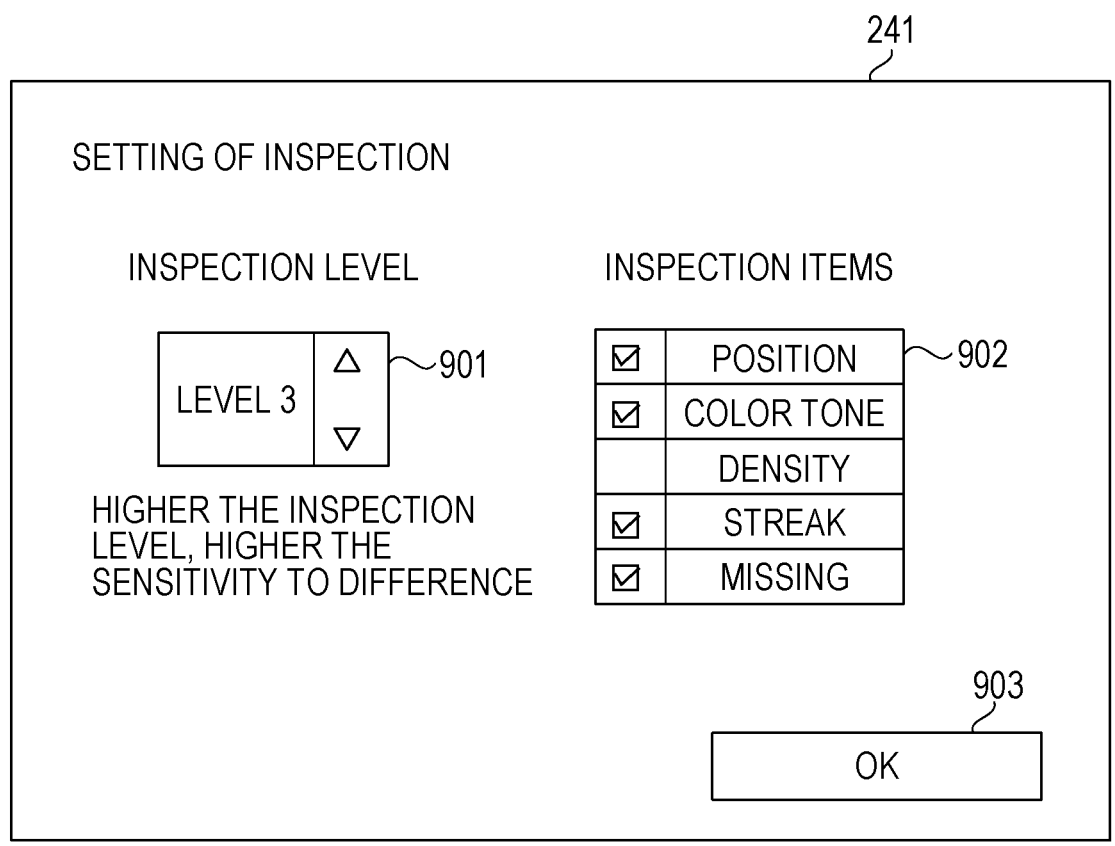
FIG. 9 is a diagram showing a display screen for performing inspection settings of an inspection apparatus.

FIG. 9 illustrates an example of an inspection setting screen. The display screen shown in FIG. 9 is displayed on the display 241 when the button 404 is selected. A level setting area 901 is used to set an inspection level. The higher the inspection level set by the level setting area 901, the higher the sensitivity of the inspection apparatus 109 to a difference between an image being inspected and a correct answer image. An inspection item setting area 902 is used to set inspection items. The user is allowed to set inspection items in the inspection item setting area 902. In the example shown in FIG. 9, the inspection item setting area 902 displayed on the display screen is in a state where a position, a color, a streak, and missing are set to be inspected, but the density is set not to be inspected. A button 903 is for confirming the settings of the inspection items. When the button 903 is selected, the inspection apparatus 109 registers the settings of the inspection items, and the screen displayed on the display 241 returns to the display screen shown in FIG. 4.

Figure 10:
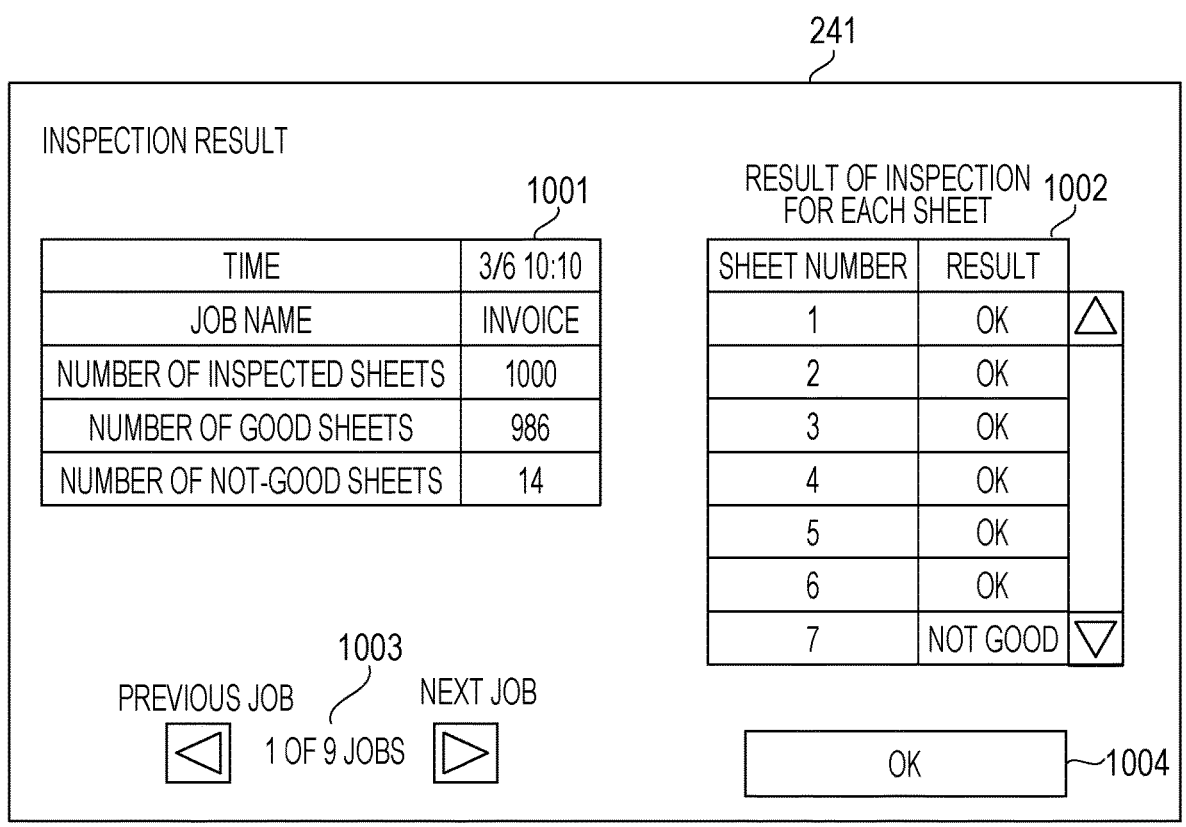
FIG. 10 is a diagram showing a display screen indicating an inspection result of an inspection apparatus.

FIG. 10 illustrates an example of a display screen on which inspection results are displayed. The display screen shown in FIG. 10 is displayed on the display 241 when the button 405 shown in FIG. 4 is selected. A property display area 1001 is for displaying properties and inspection results of a job subjected to the inspection. In a result display area 1002, inspection results are displayed for each sheet. The results are displayed in the result display area 1002 such that when a sheet read by the inspection apparatus 109 is determined to be normal, "OK" is displayed in a result field corresponding to this sheet, but in a case where a sheet read by the inspection apparatus 109 is determined to be abnormal, "NOT GOOD" is displayed in a result field corresponding to this sheet. A button 1003 is for selecting a job for which inspection results are displayed. In the example of the display screen shown in FIG. 10, the inspection results for the 1st one of 9 jobs stored in the inspection apparatus 109 are displayed. By operating the left or right end of button 1003, the user is allowed to switch the job for which the inspection results are to be displayed on the display 241. A button 1004 is for instructing to end displaying the inspection results. When the button 1004 is selected, the screen displayed on the display 241 returns to the display screen shown in FIG. 4.

Figure 11:
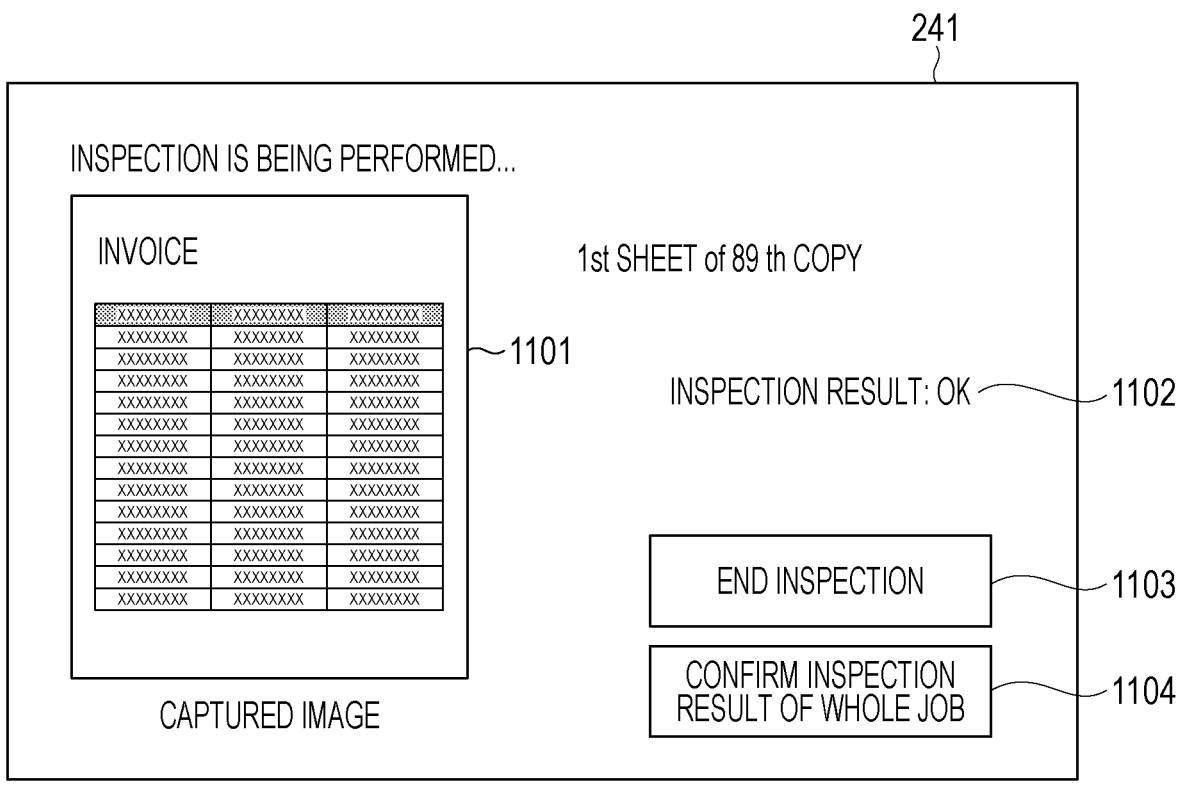
FIG. 11 is a diagram showing a display screen which is displayed when an inspection apparatus determines that a sheet is normal.

FIG. 11 illustrates an example of a display screen which is displayed on the display 241 when the inspection apparatus 109 is being performing an inspection. The display screen shown in FIG. 11 is displayed when the button 406 shown in FIG. 4 is selected. An image of a sheet read by the inspection apparatus 109 is displayed in an image display area 1101. In a result display area 1102, an inspection result obtained by comparing the read image displayed in the image display area 1101 with a correct answer image is displayed. In the example of the screen shown in FIG. 11, the sheet read by the inspection apparatus 109 is determined to be normal, and thus "OK" is displayed in the result display area 1102. A button 1103 is for instructing to end the inspection. When the button 1103 is pressed, the inspection apparatus 109 end the inspection process, and the screen displayed on the display 241 return to the display screen shown in FIG. 4. A button 1104 is for instructing to display a confirmation screen for confirming instruction results of a whole job.

When the button 1104 is selected, the display screen shown in FIG. 10 is displayed on the display 241.

Figure 12:
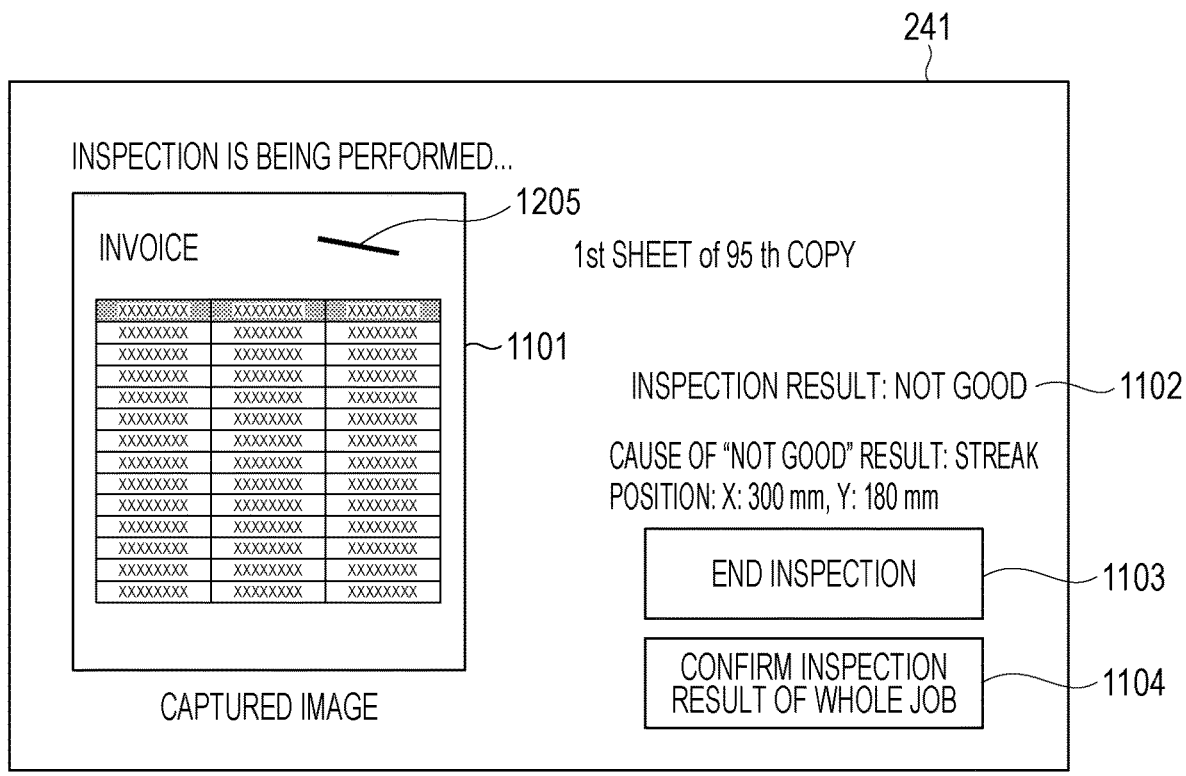
FIG. 12 is a diagram showing a display screen indicating that an inspection apparatus determines that a sheet is abnormal.

FIG. 12 illustrates an example of a display screen which is display when an image of a sheet read by the inspection apparatus 109 is determined to be abnormal. In the example shown in FIG. 12, a streak 1205 is detected on the image of the sheet read by the inspection apparatus 109, and thus "NOT GOOD" is displayed in the result display area 1102.

Inline Inspection and Offline Inspection

Next, inspection modes executable by the image forming apparatus 101 are described below. The image forming apparatus 101 can execute two inspection modes, that is, an inline inspection (a first inspection mode) and an offline inspection (a second inspection mode). The inline inspection is a mode in which an inspection is performed while executing a print job by the printing apparatus 107 such that an image is formed on a sheet by executing the print job and the resultant sheet is conveyed to the inspection apparatus 109 for the inspection. The offline inspection is a mode in which the inspection is not performed on a sheet conveyed from the printing apparatus 107 to the inspection apparatus 109, but the sheet is conveyed to the inspection apparatus 109 for the inspection independently of the execution of the print job. That is, in the offline inspection, the inspection is performed by the inspection apparatus 109 without executing the image forming process by the printing apparatus 107. Note that the sheet inspected by the inspection apparatus 109 in the offline inspection may be a sheet on which an image is formed by a printing apparatus other than the printing apparatus 107. Also note that the offline inspection may be performed such that after a sheet on which an image is formed by the printing apparatus 107 is discharged to the large-capacity stacker 110, the sheet is set by a user onto the inserter 108, and the inspection of the sheet is performed by the inspection apparatus 109.

In the inline inspection, the image forming apparatus 101 feeds a sheet from the sheet feed deck 301 or 302, and the printing apparatus 107 forms an image on the sheet. The image forming apparatus 101 conveys the sheet to the inspection apparatus 109 via the sheet conveyance path 323, and the inspection apparatus 109 reads an image of the sheet. Thus, the image forming apparatus 101 can sequentially inspect sheets on which images have been formed by the printing apparatus 107.

On the other hand, in the offline inspection, the image forming apparatus 101 feeds sheets from the inserter tray 321 of the inserter 108. The image forming apparatus 101 conveys the sheet to the inspection apparatus 109 via the sheet conveyance path 323, and the inspection apparatus 109 reads an image of the sheet. This makes it possible for the image forming apparatus 101 to also inspect sheets printed by a printing apparatus other than the printing apparatus 107.

Figure 13:
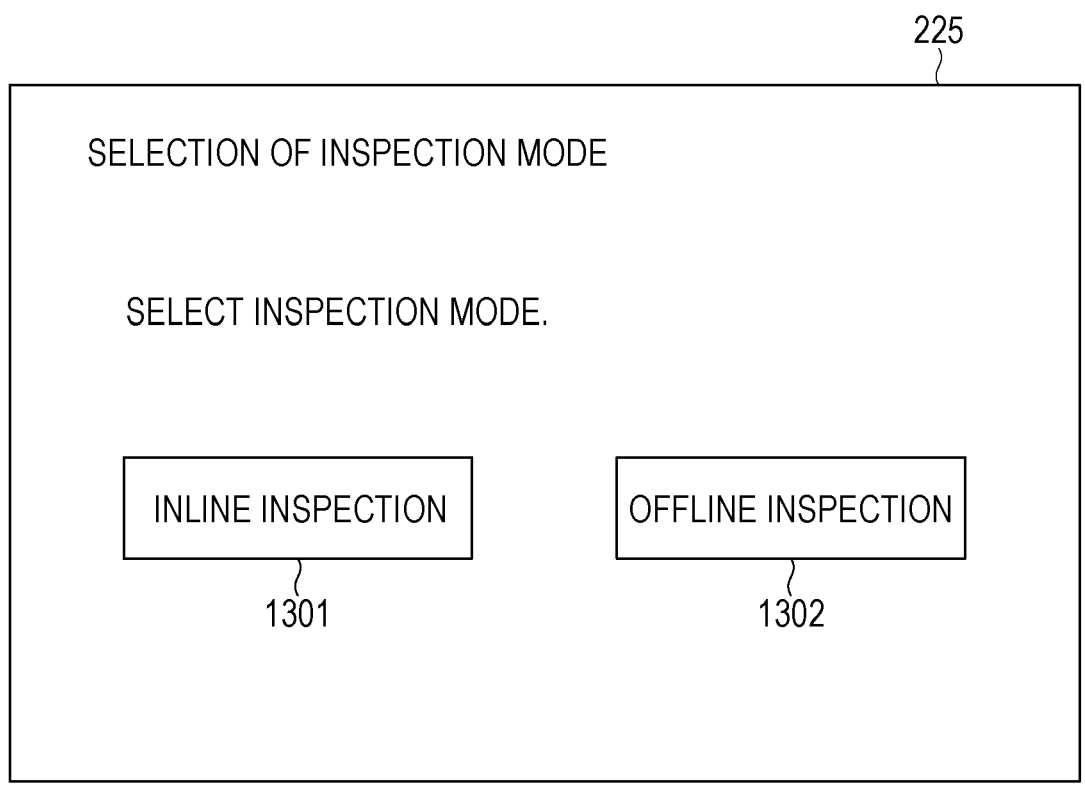
FIG. 13 is a diagram showing a display screen for selecting an inspection mode of an image forming apparatus.

Next, a method for setting the inspection mode of the image forming apparatus 101 is described with reference to FIGS. 13 to 15. FIG. 13 illustrates an example of an inspection mode selection screen displayed on the display 225. The display screen shown in FIG. 13 is displayed on the display 225 when a user performs a predetermined operation on the operation unit 224. The user selects an inspection mode to be executed by the image forming apparatus 101 on the inspection mode selection screen. A button 1301 is for selecting the inline inspection mode, and a button 1302 is for selecting the offline inspection.

The inline inspection may be set on the print job setting screen. The offline inspection may be set on a screen for setting the job type such as a print job, a scan job, or the like.

Figure 14:
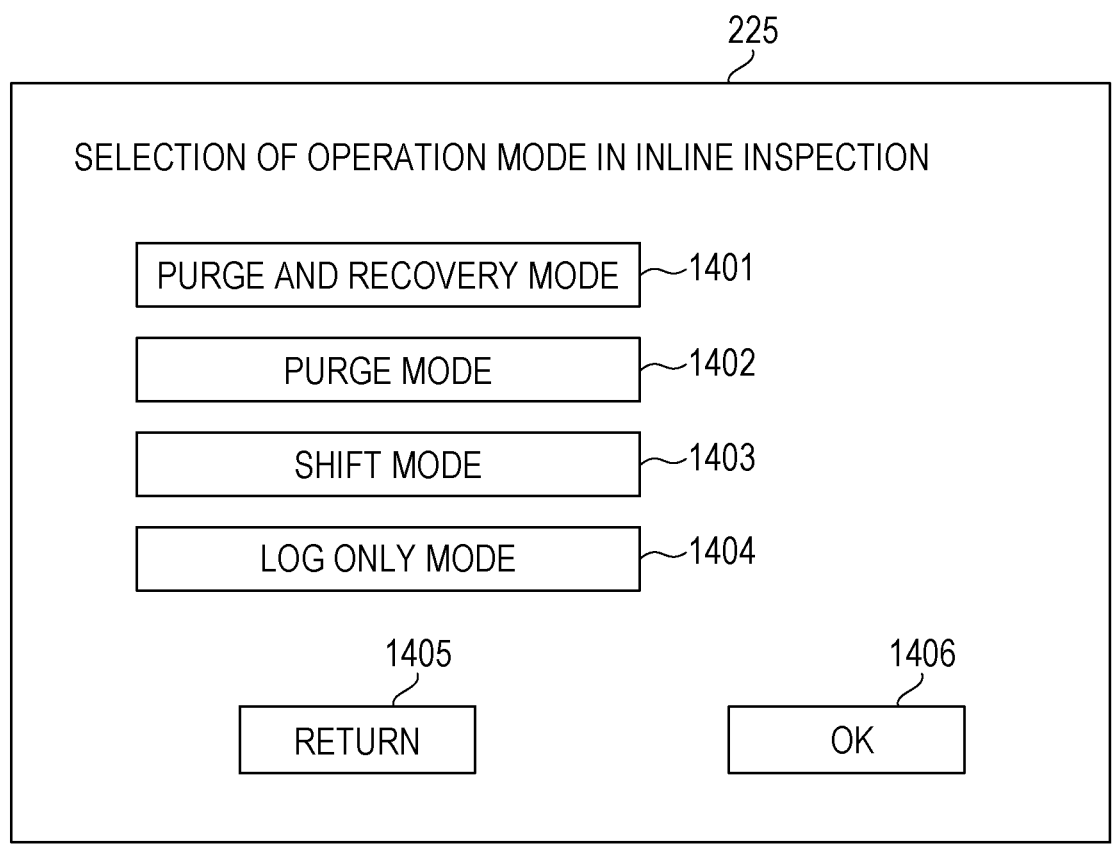
FIG. 14 is a diagram showing a display screen for setting an operation mode of an image forming apparatus in an inline inspection.

FIG. 14 illustrates an example of a setting screen for setting the operation of the image forming apparatus 101 when an abnormal sheet is detected in the inline inspection. The display screen shown in FIG. 14 is displayed on the display 225 when the button 1301 shown in FIG. 13 is selected. The image forming apparatus 101 is capable of executing a recovery process or mode in the inline inspection mode. The image forming apparatus 101 may also be capable of executing a plurality of processes or modes in the inline inspection mode including the recovery process and one or more of a purge process/mode, a shift process/mode and a log only process/mode. For example, the image forming apparatus 101 is capable of executing the purge and recovery mode, the purge mode, the shift mode, and the log only mode in the inline inspection. Operations of the image forming apparatus 101 in these respective modes will be described later. A button 1401 is for selecting the purge and recovery mode. A button 1402 is for selecting the purge mode. A button 1403 is for selecting the shift mode. A button 1404 is for selecting the log only mode. A button 1405 is for returning the screen to the inspection mode selection screen. A button 1406 is for determining the operation of the image forming apparatus 101 in the inline inspection. The user can determine the operation of the image forming apparatus 101 in the inline inspection by selecting one of the buttons 1401 to 1404 and then selecting the button 1406.

Figure 15:
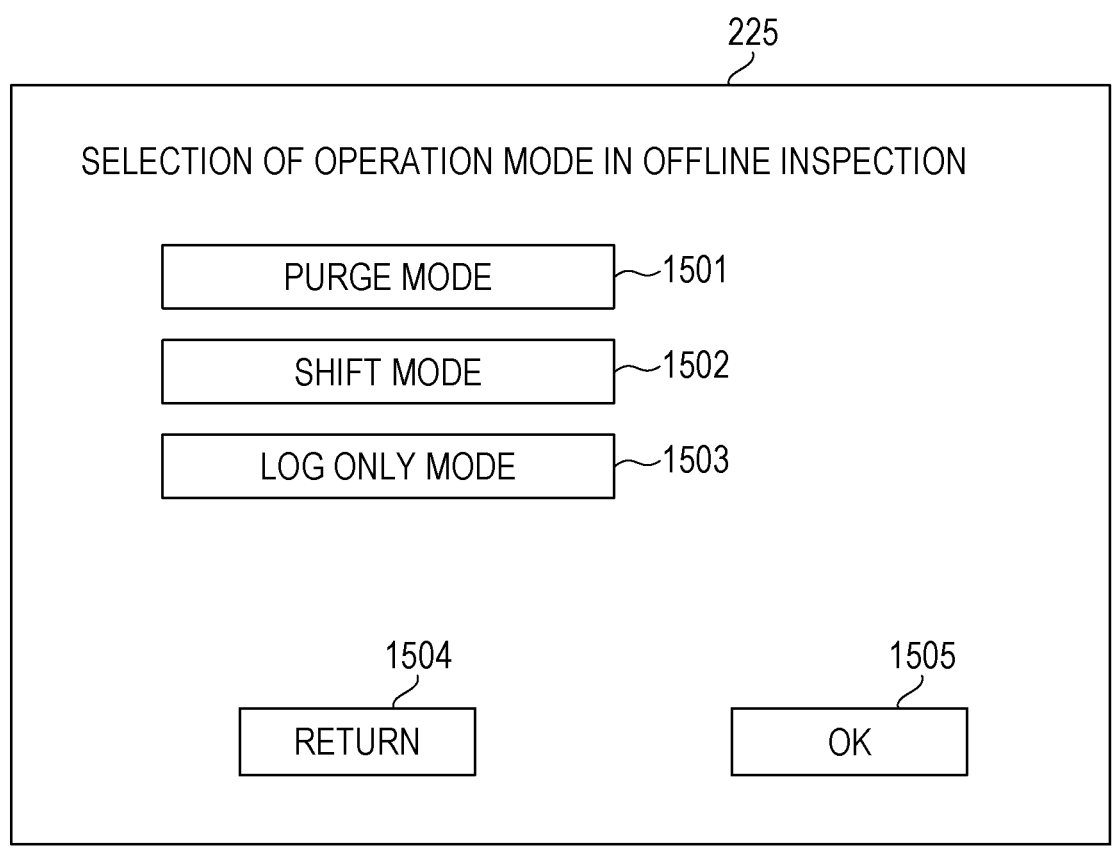
FIG. 15 is a diagram showing a display screen for setting an operation mode of an image forming apparatus in an offline inspection.

FIG. 15 is illustrates an example of a setting screen for setting the operation of the image forming apparatus 101 when an abnormal sheet is detected in the offline inspection. The display screen shown in FIG. 15 is displayed on the display 225 when the button 1302 shown in FIG. 13 is selected. The image forming apparatus 101 may be capable of executing one or more of a plurality of processes or modes in the offline inspection mode including one or more of a purge process/mode, a shift process/mode and a log only process/mode. For example, the image forming apparatus 101 is capable of executing the purge mode, the shift mode, and the log only mode in the offline inspection. Note that the image forming apparatus 101 is not allowed to set (execute) the recovery process/mode in the offline inspection. For example, the image forming apparatus 101 is not allowed to set (execute) the purge and recovery mode, in the offline inspection. A button 1501 is for selecting the purge mode. A button 1502 is for selecting the shift mode. A button 1503 is for selecting the log only mode. A button 1504 is for returning the screen to the inspection mode selection screen. A button 1505 is for determining the operation of the image forming apparatus 101 in the offline inspection. The user can determine the operation of the image forming apparatus 101 in the offline inspection by selecting one of the buttons 1501 to 1503 and then selecting the button 1505.

In the present embodiment, the setting of the inspection mode of the image forming apparatus 101 is performed via the operation unit 224 and the display 225 of the printing apparatus 107, but the setting may be performed by using the external controller 102 or the PC 103.

Operation when an Abnormal Sheet is Detected

Next, an operation of the image forming apparatus 101 is described for a case where the inspection apparatus 109 detects an abnormal sheet. In the following description, the operation is explained by way of example for a case of a job in which one copy includes five pages.

Figure 16A:
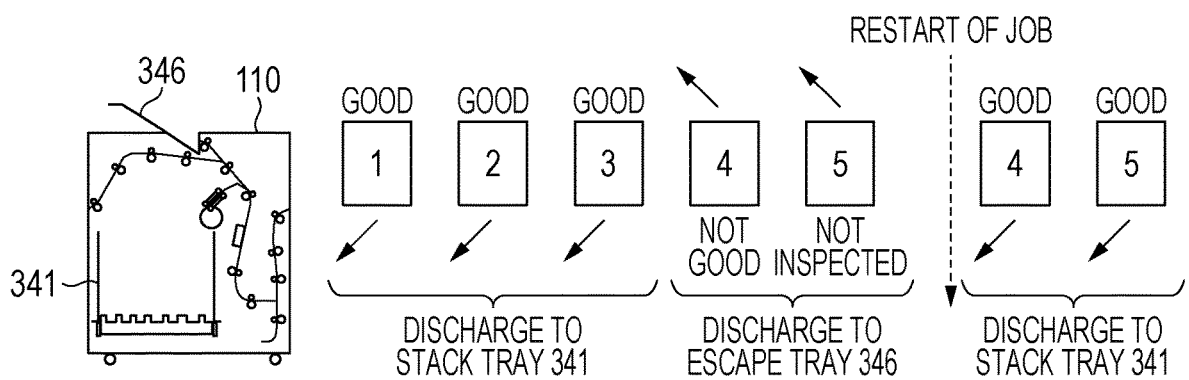
FIGS. 16A and 16B are diagrams showing sheet discharge destinations in a purge and recovery mode.
Figure 16B:
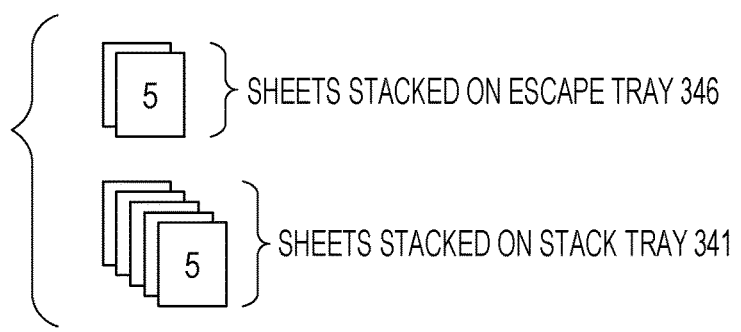

First, the operation of the image forming apparatus 101 is described below referring to FIGS. 16A and 16B for a case where the operation is performed in the purge and recovery mode. FIGS. 16A and 16B are diagrams for describing sheet discharge destinations in the purge and recovery mode. In the purge and recovery mode, in a case where the inspection apparatus 109 determines that a sheet is abnormal, the abnormal sheet is discharged to a discharge unit different from that for normal sheets, and an image corresponding to the image printed on the abnormal sheet is printed on another sheet according to image data used to form the image on the abnormal sheet. Note that the purge and recovery mode is allowed to be set only in the inline inspection. In the example shown in FIG. 16A, first to third sheets are normal and thus these sheets are discharged to the stack tray 341 in the purge and recovery mode. However, a fourth sheet is abnormal, and thus this sheet is discharged to the escape tray 346. A fifth sheet following the abnormal sheet is not inspected by the inspection apparatus 109 and is discharged to the escape tray 346 as with the abnormal sheet. After the abnormal sheet and the sheet following the abnormal sheet are discharged to the escape tray 346, the image forming apparatus 101 reprints a correct image corresponding to the image formed on the abnormal fourth sheet on a sixth sheet. Furthermore, an image corresponding to the image formed on the fifth sheet following the abnormal sheet is reprinted on a seventh sheet. The inspection apparatus 109 inspects the reprinted sixth and seventh sheets. When the reprinted sheets are normal, the sheets are discharged to stack tray 341. Finally, as shown in FIG. 16B, a product in normal pages 1 to 5 are discharged in a correct order on the stack tray 341 and thus a normal product is obtained. On the other hand, the abnormal sheet and the sheet following the abnormal sheet are stacked on the escape tray 346.

As described above, in a case where an abnormal sheet is detected, an image is reprinted on another sheet based on image data used in the forming the image of the abnormal sheet. This process is referred to as a recovery process. The process of discharging abnormal sheets to a discharge unit different from that for normal sheets is referred to as a purge process. That is, the purge and recovery mode is a mode in which the image forming apparatus 101 executes a predetermined process which is a combination of the purge process and the recovery process. In the purge and recovery mode, the image forming apparatus 101 does not perform inspection using the inspection apparatus 109 on a sheet following an abnormal sheet, and the following sheet is discharged to the escape tray 346. Thus, a product obtained after the recovery process has a correct page order.

Figure 17A:
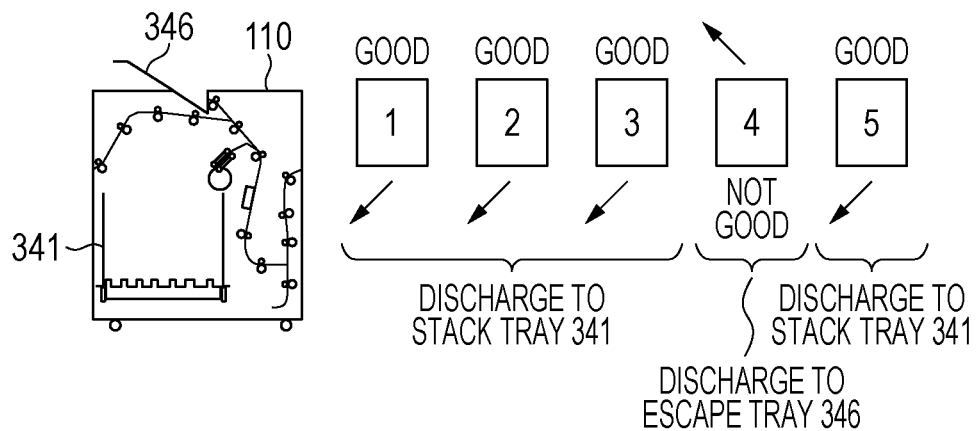
FIGS. 17A and 17B are diagrams showing sheet discharge destinations in a purge mode.
Figure 17B:
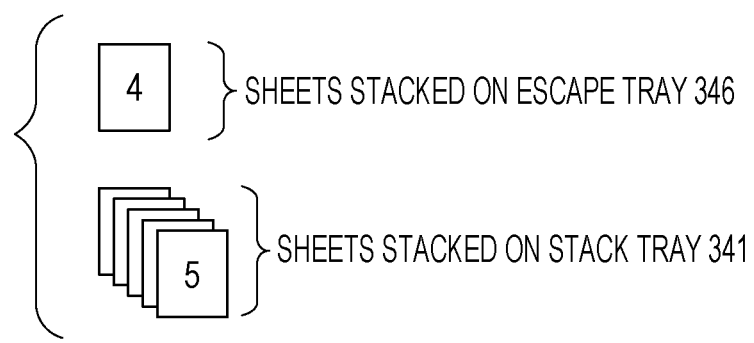

Next, the operation of the image forming apparatus 101 is described below referring to FIGS. 17A and 17B for a case where the operation is performed in the purge mode. FIGS. 17A and 17B are diagrams for describing sheet discharge destinations in the purge mode. In the purge mode, in a case where the inspection apparatus 109 determines that a sheet is abnormal, this abnormal sheet is discharged to a discharge unit different from that for normal sheets. In purge mode, the image forming apparatus 101 does not perform the recovery process. The purge mode can be set in both the inline inspection and the offline inspection. In the example shown in FIG. 17A, first to third sheets are normal and thus these sheets are discharged to the stack tray 341 in the purge mode. However, a fourth sheet is abnormal, and thus this sheet is discharged to the escape tray 346. A fifth sheet is inspected by the inspection apparatus 109. In this example, the fifth sheet is normal, and this fifth sheet is discharged to the stack tray 341. Finally, the first to third sheets and the fifth sheet are stacked on the stack tray 341, and only the sheet of the fourth page, which is abnormal, is stacked on the escape tray 346. In the purge mode, the image forming apparatus 101 executes the purge process in the above-described manner.

Figure 18A:
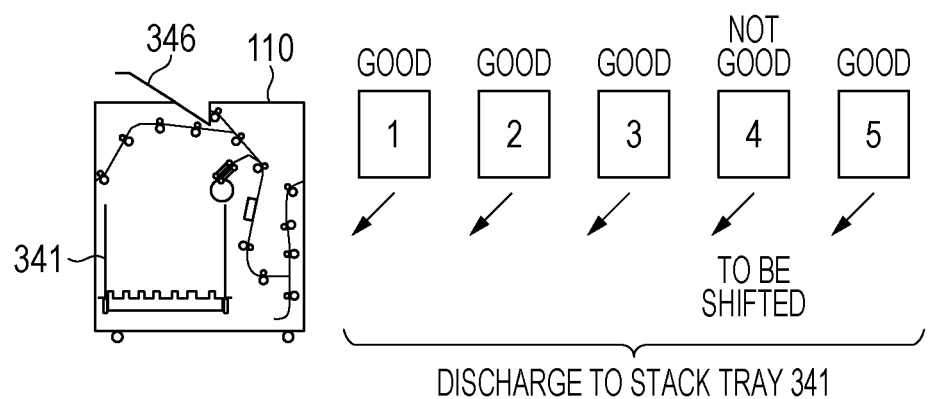
FIGS. 18A and 18B are diagrams showing a sheet discharge destination in a shift mode.
Figure 18B:
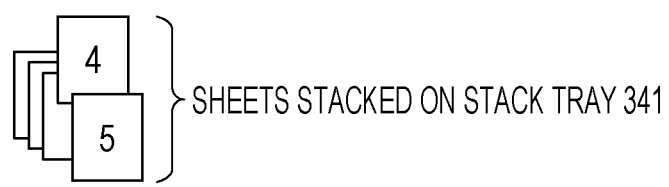

Next, the operation of the image forming apparatus 101 is described below referring to FIGS. 18A and 18B for a case where the operation is performed in the shift mode. FIGS. 18A and 18B are diagrams for describing sheet discharge destinations in the shift mode. In the shift mode, in a case where the inspection apparatus 109 determines that a sheet is abnormal, this abnormal sheet is discharged to a position shifted by a predetermined amount from positions of normal sheets. In the shift mode, the image forming apparatus 101 does not perform the recovery process. The shift mode can be set in both the inline inspection and the offline inspection. In the shift mode, as shown in FIG. 18A, first to fifth sheets are discharged to the stack tray 341 regardless of whether the sheets are normal or not. In this process, an abnormal sheet (a fourth sheet in this specific example) is discharged to a position shifted by a predetermined amount, for example, in a direction perpendicular to the conveying direction with respect to the positions of normal sheets (the first to third sheets, in this example). Finally, the sheets of pages 1 to 5 are stacked on the stack tray 341 such that only the fourth sheet, which is abnormal, is shifted. The process of discharging the abnormal sheet to a position shifted by a predetermined amount from the positions of the normal sheets in the above-described manner is referred to as a shift process.

Figure 19A:
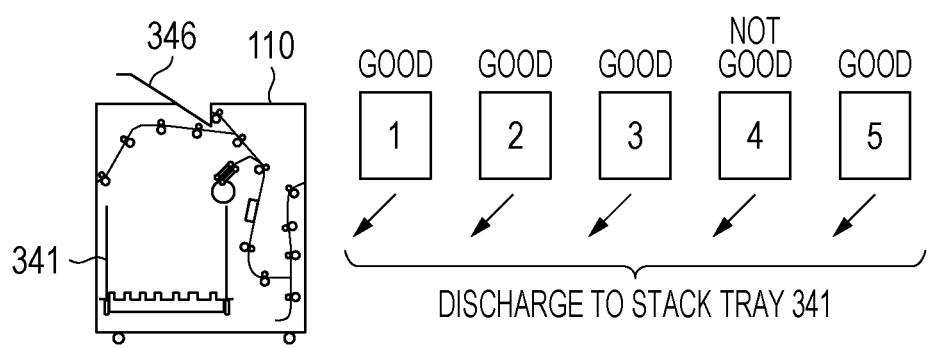
FIGS. 19A and 19B are diagrams showing a sheet discharge destination in a log only mode.
Figure 19B:
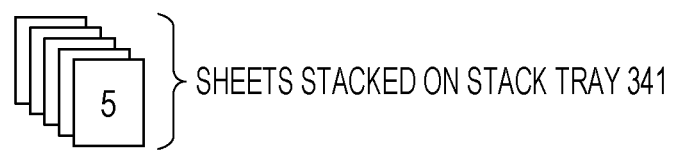

Next, the operation of the image forming apparatus 101 is described below referring to FIGS. 19A and 19B for a case where the operation is performed in the log only mode. FIGS. 19A and 19B are diagrams for describing sheet discharge destinations in the log only mode. In the log only mode, in a case where the inspection apparatus 109 determines that a sheet is abnormal, the abnormal sheet is discharged in the same manner as the normal sheets, and only logging of the abnormal sheet is performed (e.g. information identifying which of the sheets is an abnormal sheet is logged or recorded). In the log only mode, the image forming apparatus 101 does not perform the recovery process. The log only mode can be set in both the inline inspection and the offline inspection. In the log only mode, as shown in FIG. 19A, first to fifth sheets are discharged to the stack tray 341 regardless of whether the sheets are normal or not. Finally, the sheets of pages 1 to 5 including a fourth sheet, which is an abnormal sheet, are stacked on the stack tray 341 such that all pages are correctly aligned. That is, in the log only mode, as described above, all sheets are discharged in the same manner without discharging abnormal sheets in a different manner from the manner for normal sheets, and for the abnormal sheets, only logging is performed. The process performed in such that manner is referred to as a log only process.

Note that in all above-described modes, including the purge and recovery mode, the purge mode, the shift mode, and the log only mode, the inspection apparatus 109 records information about abnormal sheets, and the user can check the inspection results on the display 241. In the examples shown in FIGS. 16A and 16B to FIGS. 19A and 19B, the fourth sheet is abnormal, and the CPU 238 of the inspection apparatus 109 records in the memory 239 information indicating that the fourth sheet is abnormal.

Of the purge and recovery mode, the purge mode, the shift mode, and the log only mode, the recovery process is executed only in the purge and recovery mode.

Control Flow

Next, a control flow of the image forming apparatus 101 is described with reference to FIGS. 20 and 21. One or more steps of the control flow may be performed by a controller of the image forming system or apparatus 101 which may include CPU 222 and/or CPU 233 and/or CPU 238 and/or CPU 245 or may include a computer or processing unit that controls operations of at least the printing apparatus 107, the inserter 108, the inspection apparatus 109 (and may be also discharge portions of the stacker 110).

Figure 20:
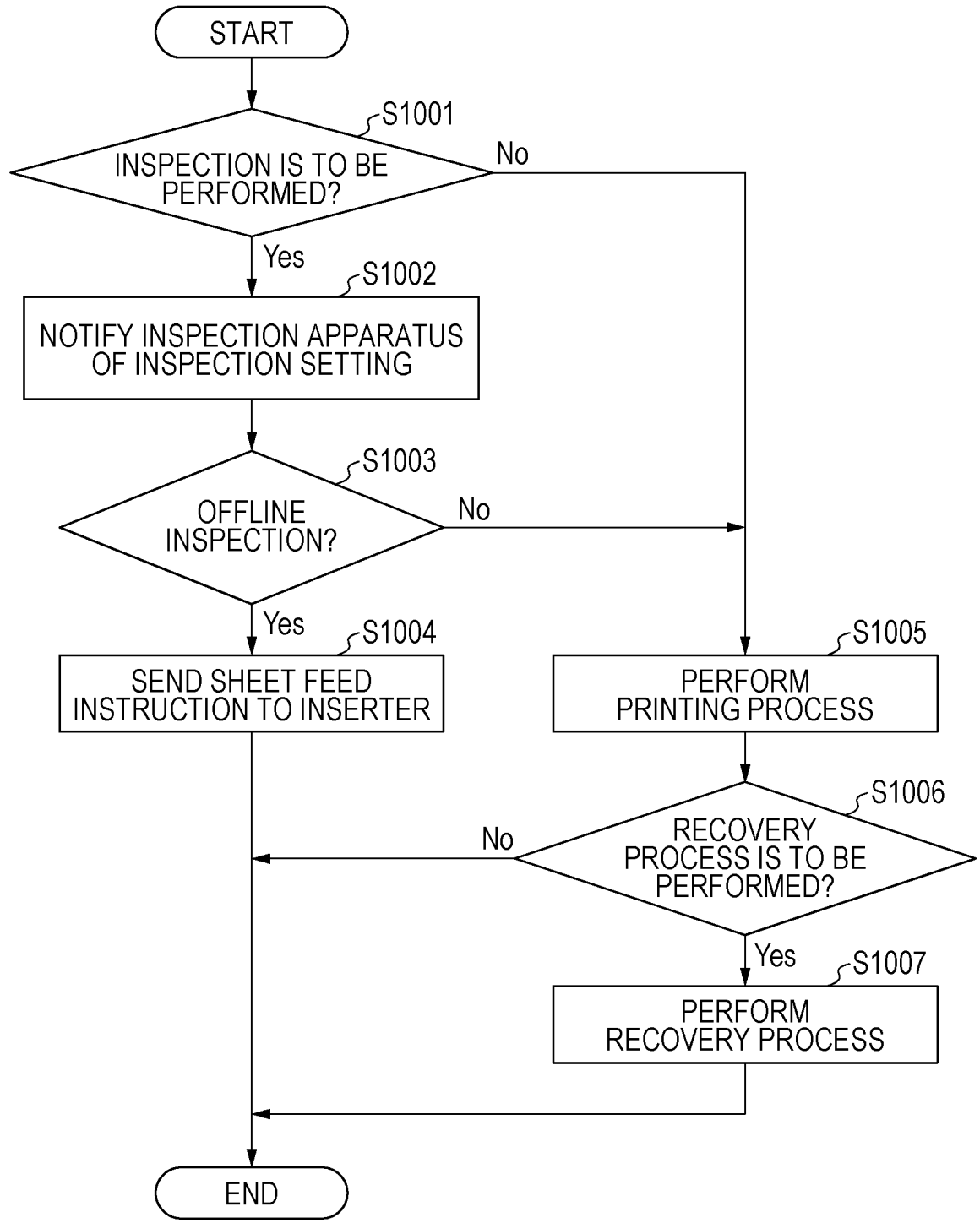
FIG. 20 is a flowchart showing control of a printing apparatus according to a first embodiment.
Figure 21:
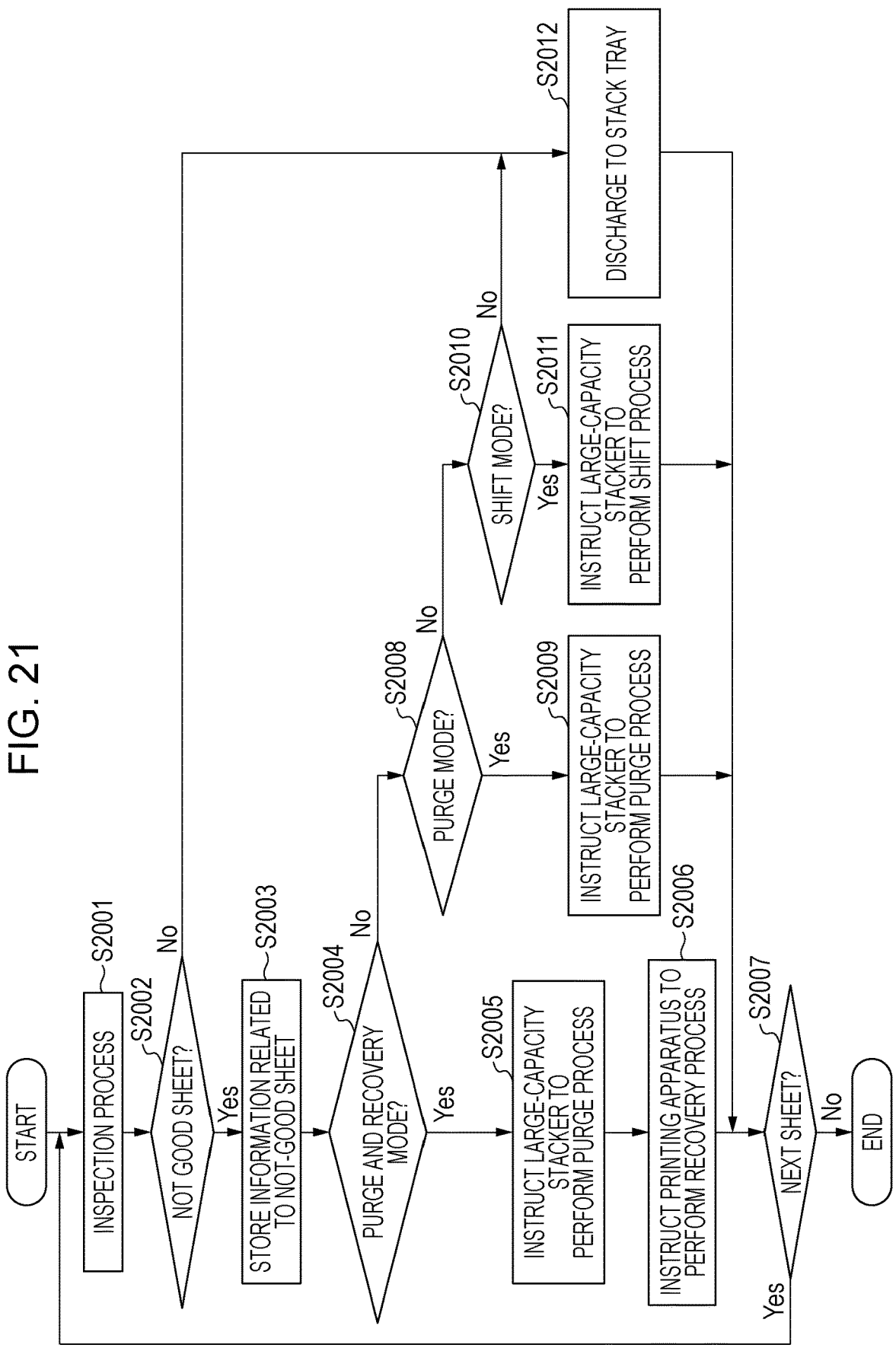
FIG. 21 is a flowchart showing control of an inspection apparatus according to the first embodiment.

FIG. 20 is a flowchart showing a flow of processing executed by the CPU 222 of the printing apparatus 107. When a job is started, the CPU 222 determines whether or not the job includes an execution of an inspection (S1001). In this process (S1001), the CPU 222 makes the determination based on job information received from the external controller 102.

In a case where it is specified to execute an inspection in a given job (Yes in S1001), the CPU 222 sends inspection setting information to the inspection apparatus 109. For example, the inspection setting information may set by user (such as via the inspection setting screen shown in FIG. 9). The inspection apparatus 109 inspects sheets according to this inspection setting information (S1002). The process executed by the inspection apparatus 109 will be described later. Next, the CPU 222 determines whether or not the offline inspection is specified as the inspection mode (S1003). In a case where the offline inspection is specified as the inspection mode (Yes in S1003), the CPU 222 instructs the inserter 108 to execute to feed sheets (S1004). As a result, the inserter 108 starts feeding sheets to the inspection apparatus 109.

On the other hand, in a case where the job specifies not to perform the inspection (No in S1001) or in a case where the inline inspection is specified as the inspection mode (No in S1003), the CPU 222 executes a printing process (S1005). The CPU 222 then determines whether or not to execute the recovery process based on the result of the inspection performed by the inspection apparatus 109 (S1006). In a case where the recovery process is necessary (Yes in S1006), for example in the case where the inspection apparatus 109 determines that the sheet conveyed is an abnormal sheet, the CPU 222 executes the recovery process (S1007) and then ends the processing flow.

In a case where the recovery process is not necessary (No in S1006), for example in the case where the inspection apparatus 109 determines that the sheet conveyed is a normal sheet, the CPU 222 ends the processing flow without executing the recovery process.

The processing executed by the CPU 238 of the inspection apparatus 109 is described. FIG. 21 is a flowchart showing a flow of processing executed by the CPU 238 of the inspection apparatus 109. The processing shown in this flowchart shown in FIG. 21 is started when a sheet is conveyed to the inspection apparatus 109.

When the sheet is conveyed to the inspection apparatus 109, the inspection apparatus 109 reads the images of the sheet using the reading units 331 and 332, and inspects whether the images of the sheet are normal (S2001). In the case of the inline inspection, the inspection apparatus 109 inspects sheets on which images are formed by the printing apparatus 107, while in the case of the offline inspection, the inspection apparatus 109 inspects sheets fed from the inserter tray 321 of the inserter 108.

Next, the CPU 238 determines whether or not the inspected sheet is abnormal (S2002). In a case where the inspected sheet is abnormal (Yes in S2002), the CPU 238 records information related to the abnormal sheet (S2003).

Thereafter, the CPU 238 determines whether or not the purge and recovery mode is specified based on the inspection setting information sent from the CPU 222 (S2004). In a case where the purge and recovery mode is specified (Yes in S2004), the CPU 238 instructs the large-capacity stacker 110 to perform the purge process (S2005). Thereafter, the CPU 238 instructs the printing apparatus 107 to execute the recovery process such that a correct image corresponding to the image formed on the abnormal sheet is printed on another sheet (S2006). After that, the CPU 238 determines whether or not there is a next sheet (S2007). In a case where there is a next sheet (Yes in S2007), the processing flow returns to S2001. However, in a case where there is no next sheet (No in S2007), the CPU 238 ends the processing flow.

In a case where the purge and recovery mode is not specified (No in S2004), the CPU 238 determines whether the purge mode is specified (S2008). In a case where the purge mode is specified (Yes in S2008), the CPU 238 instructs the large-capacity stacker 110 to perform the purge process (S2009). Thereafter, the processing flow proceeds to S2007.

In a case where the purge mode is not specified (No in S2008), the CPU 238 determines whether the shift mode is specified (S2010). In a case where the shift mode is specified (Yes in S2010), the CPU 238 instructs the large-capacity stacker 110 to perform the shift process (S2011). Thereafter, the processing flow proceeds to S2007.

In a case where the shift mode is not specified (No in S2010), or in a case where a sheet inspected by the inspection apparatus 109 is normal (No in S2002), the CPU 238 instructs the large-capacity stacker 110 to discharge the sheet to the stack tray 341 (S2012) in a usual manner. Thereafter, the processing flow proceeds to S2007.

By performing the control in the above-described manner, the image forming apparatus 101 can perform the inline inspection and the offline inspection.

In the present embodiment, when the user selects the inline inspection, the user further selects one of the purge and recovery mode, the purge mode, the shift mode, and the log only mode (see FIG. 14). On the other hand, when the user selects the offline mode, the user further selects one of the purge mode, the shift mode, and the log only mode (see FIG. 15). That is, in the case where the user selects the offline inspection, the user is not allowed to further select the purge and recovery mode including the recovery process. Therefore, in the offline inspection, the CPU 238 always determines "No" in S2004 in the flowchart in FIG. 21.

In the offline inspection, the image forming apparatus 101 does not perform image formation by the printing apparatus 107, and thus the image forming apparatus 101 does not perform the recovery process. Therefore, in the present embodiment, as shown in FIG. 15, when the offline inspection is selected, the options displayed on the display 225 do not include the purge and recovery mode. That is, when the offline inspection is selected, the CPU 222 prohibits the selection of the recovery process. This makes it possible to prevent the user from erroneously selecting the purge and recovery mode including the recovery process in the offline inspection. However, when the inline inspection is selected, the CPU 222 permits the selection of the recovery process.

Figure 22:
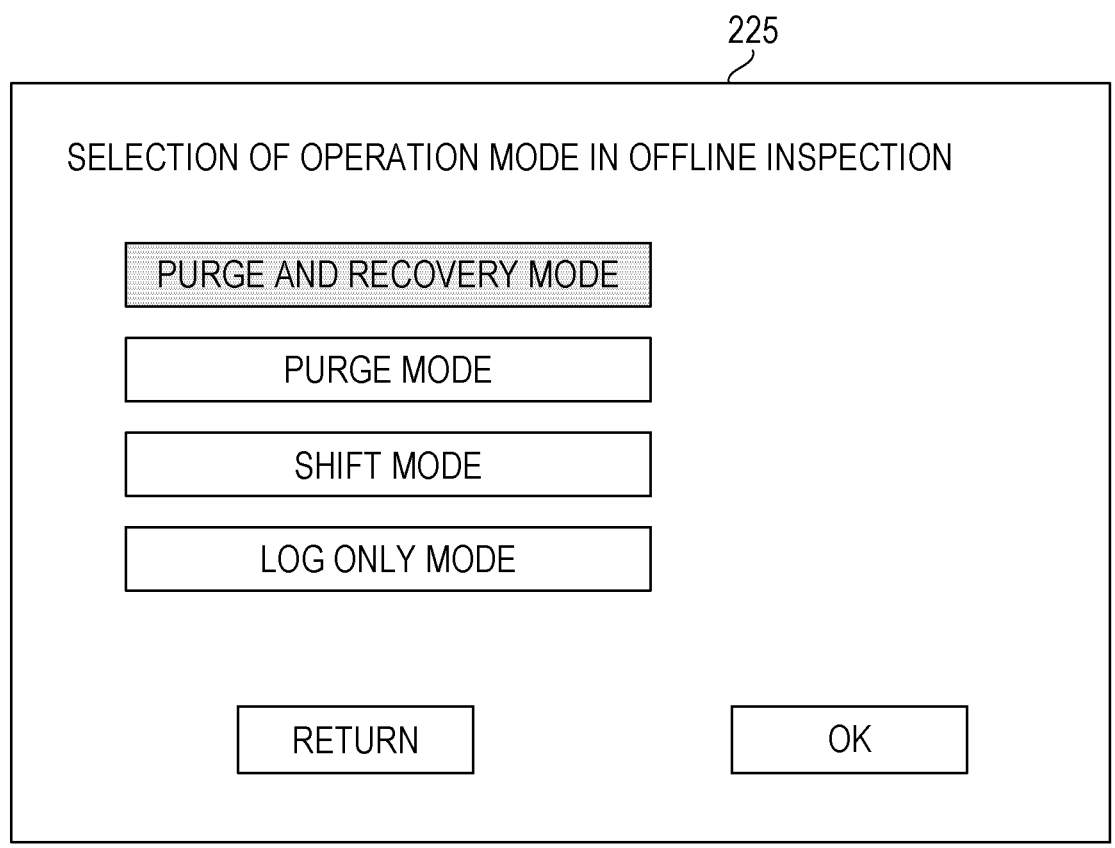
FIG. 22 is a diagram showing another example of a display screen for setting an operation mode of an image forming apparatus in an offline inspection.

In the present embodiment, when the offline inspection is selected, the image forming apparatus 101 does not display the purge and recovery mode as an option on the display 225 thereby prohibiting the selection of the recovery process. However, the method of prohibiting the recovery process is not limited to this example. For example, as shown in FIG. 22, on the screen displayed on the display 225, the option of the purge and recovery mode may be made unselectable by masking it (in the graying-out manner).

Second Embodiment

Next, a second embodiment is described. In the first embodiment described above, by way of example, the image forming apparatus 101 is configured to be capable of executing both the inline inspection and the offline inspection such that a user is prohibited from selecting the recovery process in the offline inspection mode. In contrast, in a second embodiment described below, when setting is made so as to execute the recovery process in the offline inspection, the image forming apparatus 101 notifies a user of an error and stops the job (e.g. stops the inspection job which involves inspecting sheets conveyed to the inspecting apparatus 109). In the second embodiment, unlike the first embodiment, even when the offline inspection is selected, the user can select the purge and recovery mode. Note that the hardware configuration of the image forming system in the second embodiment is the same as that in the first embodiment, and thus a duplicated description thereof is omitted.

Figure 23:
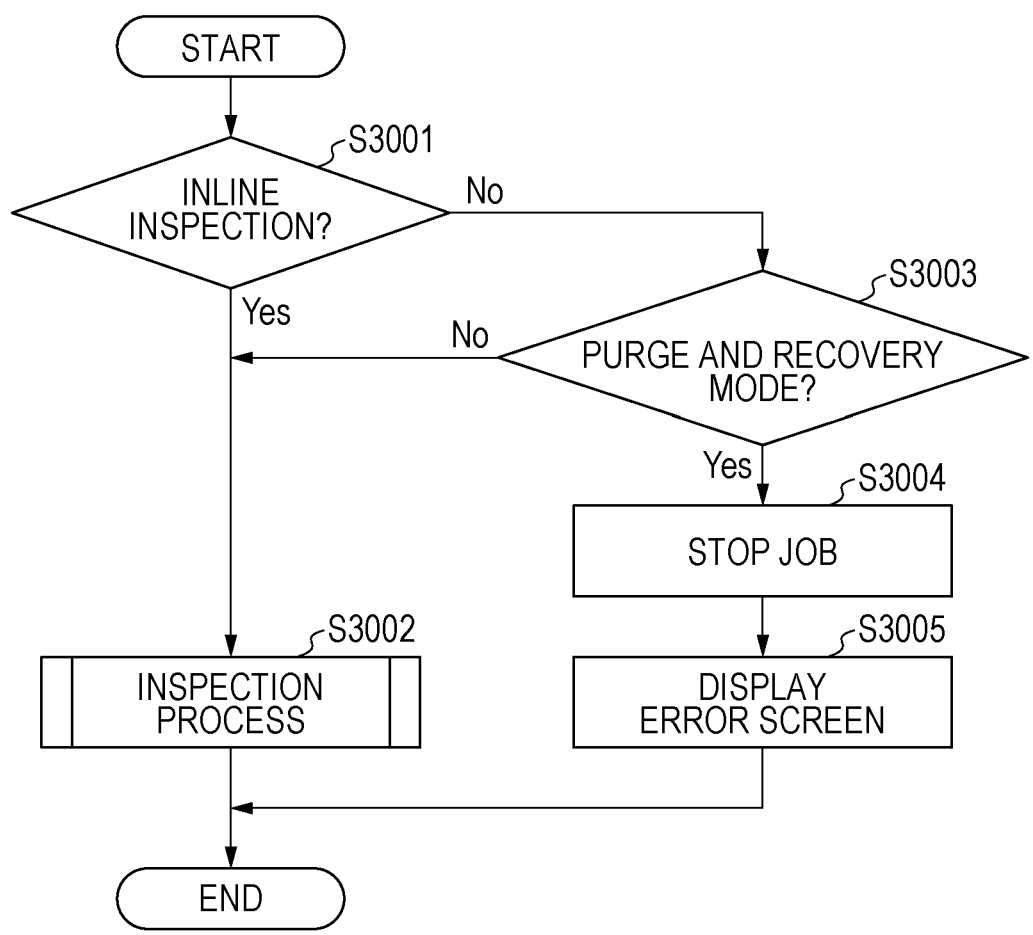
FIG. 23 is a flowchart showing control of an inspection job according to a second embodiment.

FIG. 23 is a flowchart showing a flow of control of an inspection job executed by the image forming apparatus 101 according to the second embodiment. When the job is started, the CPU 222 determines whether the inline inspection or the offline inspection is set as the inspection mode (S3001). In a case where the inline inspection is selected (Yes in S3001), the CPU 222 starts the print and inspection process (S3002). The print and the inspection process in S3002 is the same as the inline inspection process in the flowchart shown in FIG. 20 described above, and thus a further description thereof is omitted.

On the other hand, in a case where the offline inspection is selected (No in S3001), the CPU 222 determines whether or not the purge and recovery mode is selected (S3003). In a case where the purge and recovery mode is not selected (No in S3003), the CPU 222 executes the inspection process.

In a case where the purge and recovery mode is selected (Yes in S3003), the CPU 222 cancels the job (S3004). That is, in the case where the purge and recovery mode is selected in the offline inspection, the image forming apparatus 101 does not feed sheets by the inserter 108. The CPU 222 displays an error screen on the display 225 (S3005).

FIG. 24 illustrates an example of an error screen displayed on the display 225. After that, the CPU 222 ends the process.

As described above, when the purge and recovery mode including the recovery process is specified in the offline inspection, the image forming apparatus 101 cancels the job and does not feed sheets. Therefore, in the second embodiment, even when the user erroneously sets the recovery process to be executed in the offline inspection, the image forming apparatus 101 can prompt the user to remake the appropriate settings.

In the first and second embodiments described above, the image forming apparatus 101 can execute a plurality of modes including the purge and recovery mode, the purge mode, the shift mode, and the log only mode. However, to reduce the number of user operations, modes executed by the image forming apparatus 101 may be fixed in each of the inline inspection and the offline inspection. For example, the image forming apparatus 101 may be set to execute the purge and recovery mode in the inline inspection, and to execute the shift mode in the offline inspection. The modes executable by the image forming apparatus 101 in each of the inline inspection and the offline inspection in the first and second embodiments are merely examples, and modes selectable in each inspection mode may be different from those described in the above examples.

In the embodiments described above, the purge and recovery mode has been described as an example of a mode including the recovery process. However, the image forming apparatus 101 may be capable of executing a mode including the recovery process other than the purge and recovery mode. For example, the image forming apparatus 101 may be capable of executing a mode in which when an abnormal sheet occurs, the recovery process is performed without performing the purge process. In this case, modes including the recovery process other than the purge and recovery mode are also prohibited from being selected in the offline inspection, as with the purge and recovery mode.

In the embodiments described above, the image forming apparatus 101 feeds sheets from the sheet feed decks 301 and 302 in the inline inspection, and feeds sheets from the inserter 108 in the offline inspection. However, the sheet feeding method is not limited to this. For example, the image forming apparatus 101 may feed sheets from the sheet feed decks 301 and 302 in the offline inspection. In this case, the image forming apparatus 101 conveys sheets to the inspection apparatus 109 without forming an image by the printing apparatus 107.

According to the present disclosure, it is possible to improve processing performed when an abnormal sheet occurs in an image forming system capable of performing both the inline inspection and the offline inspection.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments and is defined by the appended claims.

This application claims the benefit of Japanese Patent Application No. 2021-158383, filed Sep. 28, 2021, which is hereby incorporated by reference herein in its entirety.

What is claimed is:

1. An image forming system comprising:
    an image forming unit configured to form an image on a sheet;
    an inspection unit configured to inspect an image on a sheet;
    a conveyance unit configured to convey a sheet to the inspection unit;
    a controller configured to execute a first inspection mode in which an image is formed on a sheet by the image forming unit and the sheet having the image formed thereon is conveyed by the conveyance unit to the inspection unit and is inspected by the inspection unit, and a second inspection mode in which, without executing image forming by the image forming unit, a sheet is conveyed by the conveyance unit to the inspection unit and inspected by the inspection unit; and
    a setting unit configured to set a recovery process such that in a case where the inspection unit determines that the sheet conveyed by the conveyance unit is an abnormal sheet having abnormality in the image, an image corresponding to the image formed on the abnormal sheet is formed according to image data used to form the image on the abnormal sheet by the image forming unit on a sheet different from the abnormal sheet,
    wherein the setting unit permits the setting of the recovery process in the first inspection mode and prohibits the setting of the recovery process in the second inspection mode.

2. The image forming system according to claim 1, wherein
    the setting unit includes a display unit configured to display a plurality of soft keys for selecting a process to be executed by the controller from a plurality of processes including the recovery process, and
    the setting unit prohibits the setting of the recovery process in the second inspection mode by displaying a soft key for selecting the recovery process on the display unit such that the selecting of the soft key is disabled.

3. The image forming system according to claim 1, wherein
    the setting unit includes a display unit configured to display a plurality of soft keys for selecting a process to be executed by the controller from a plurality of processes including the recovery process, and
    the setting unit prohibits the setting of the recovery process in the second inspection mode by not displaying a soft key for setting the recovery process on the display unit.

4. The image forming system according to claim 1, wherein
    the conveyance unit is an inserting unit including a sheet feed tray and configured to insert an insertion sheet fed from the sheet feed tray between a plurality of sheets on which images are formed by the image forming unit, and
    a sheet to be inspected by the inspection unit in the second inspection mode is fed from the sheet feed tray.

5. The image forming system according to claim 1, further comprising
    a first discharge portion and a second discharge portion each configured to discharge a sheet,
    wherein the controller is capable of executing a purge process such that in a case where a sheet is determined to be normal by the inspection unit, the sheet is discharged to the first discharge portion, while in a case where a sheet is determined to be abnormal by the inspection unit, the sheet is discharged to the second discharge portion.

6. The image forming system according to claim 5, wherein the controller executes both the recovery process and the purge process in a case where the recovery process is set by the setting unit in the first inspection mode.

7. The image forming system according to claim 5, wherein the setting unit permits a setting of the purge process in both the first inspection mode and the second inspection mode.

8. The image forming system according to claim 1, wherein
    the controller is capable of executing a shift process in which a sheet determined to be abnormal by the inspection unit is discharged such that the abnormal sheet is shifted with respect to a sheet determined to be normal by the inspection unit, and
    the setting unit permits a setting of the shift process in both the first inspection mode and the second inspection mode.

9. The image forming system according to claim 1, wherein
    the controller is capable of executing a log only process in which a sheet determined to be normal by the inspection unit and a sheet determined to be abnormal by the inspection unit are both discharged in a similar manner, and information is recorded which indicates which sheet, of sheets inspected by the inspection unit, is abnormal, and
    the setting unit permits a setting of the log only process in both the first inspection mode and the second inspection mode.

10. An image forming system comprising:
    an image forming unit configured to form an image on a sheet;
    an inspection unit configured to inspect an image on a sheet;
    a conveyance unit configured to convey a sheet to the inspection unit;
    a controller configured to execute a first inspection mode in which an image is formed on a sheet by the image forming unit and the sheet having the image formed thereon is conveyed by the conveyance unit to the inspection unit and is inspected by the inspection unit, and a second inspection mode in which, without executing image forming by the image forming unit, a sheet is conveyed by the conveyance unit to the inspection unit and inspected by the inspection unit; and a setting unit configured to set a recovery process such that in a case where the inspection unit determines that the sheet conveyed by the conveyance unit is an abnormal sheet having abnormality in the image, an image corresponding to the image formed on the abnormal sheet is formed according to image data used to form the image on the abnormal sheet by the image forming unit on a sheet different from the abnormal sheet, wherein in a case where a job is started in a state in which the recovery process is set by the setting unit so as to be performed in the second inspection mode, the controller cancels the job.

11. The image forming system according to claim 10, wherein the setting unit includes a display unit configured to display an error in a case where the job is started in a state in which the recovery process is set to be performed in the second inspection mode.

12. An image forming system comprising:
- an image forming unit configured to form an image on a sheet;
- an inspection unit configured to inspect an image on a sheet;
- a conveyance unit configured to convey a sheet to the inspection unit;
- a controller configured to execute a first inspection mode in which an image is formed on a sheet by the image forming unit and the sheet having the image formed thereon is conveyed by the conveyance unit to the inspection unit and is inspected by the inspection unit, and a second inspection mode in which, without executing image forming by the image forming unit, a sheet is conveyed by the conveyance unit to the inspection unit and inspected by the inspection unit; and
- a setting unit configured to set a predetermined process in which in a case where a sheet conveyed by the conveyance unit is determined, by the inspection unit, to be an abnormal sheet having abnormality in the image, the abnormal sheet is discharged to a discharge portion different from a discharge portion to which a normal sheet is discharged, and an image corresponding to the image formed on the abnormal sheet is printed according to image data used to form the image on the abnormal sheet on a sheet different from the abnormal sheet, wherein the setting unit permits setting of the predetermined process in the first inspection mode and prohibits setting of the predetermined process in the second inspection mode.

13. A method of controlling an image forming system including an image forming unit configured to form an image on a sheet, an inspection unit configured to inspect an image on a sheet, and a conveyance unit configured to convey a sheet to the inspection unit, the method comprising:
- selecting one of a first inspection mode in which an image is formed on a sheet by the image forming unit and the sheet having the image formed thereon is conveyed by the conveyance unit to the inspection unit and is inspected by the inspection unit, and a second inspection mode in which, without executing image forming by the image forming unit, a sheet is conveyed by the conveyance unit to the inspection unit and inspected by the inspection unit; and
- setting a recovery process such that in a case where the inspection unit determines that the sheet conveyed by the conveyance unit is an abnormal sheet having abnormality in the image, an image corresponding to the image formed on the abnormal sheet is formed according to image data used to form the image on the abnormal sheet by the image forming unit on a sheet different from the abnormal sheet, wherein in the setting, the setting of the recovery process in the first inspection mode is permitted but the setting of the recovery process in the second inspection mode is prohibited.

* * * * *